(12) United States Patent
Suzuki

(10) Patent No.: US 11,628,951 B2
(45) Date of Patent: Apr. 18, 2023

(54) ELECTRONIC COMPONENT AND AIRCRAFT WITH ELECTRONIC COMPONENT ATTACHED THERETO

(71) Applicant: AERONEXT INC., Tokyo (JP)

(72) Inventor: Yoichi Suzuki, Tokyo (JP)

(73) Assignee: AERONEXT INC., Tokyo (JP)

(*) Notice: Subject to any disclaimer, the term of this patent is extended or adjusted under 35 U.S.C. 154(b) by 0 days.

(21) Appl. No.: 15/734,133

(22) PCT Filed: Aug. 13, 2018

(86) PCT No.: PCT/JP2018/030230
§ 371 (c)(1),
(2) Date: Dec. 1, 2020

(87) PCT Pub. No.: WO2019/234945
PCT Pub. Date: Dec. 12, 2019

(65) Prior Publication Data
US 2021/0214098 A1     Jul. 15, 2021

(30) Foreign Application Priority Data

Jun. 4, 2018   (JP) .............................. JP2018-106703

(51) Int. Cl.
*B64D 47/08*   (2006.01)
*B64C 39/02*   (2023.01)
(Continued)

(52) U.S. Cl.
CPC ............ *B64D 47/08* (2013.01); *B64C 39/024* (2013.01); *G03B 15/006* (2013.01);
(Continued)

(58) Field of Classification Search
None
See application file for complete search history.

(56) References Cited

U.S. PATENT DOCUMENTS

2015/0120094 A1   4/2015   Kimchi et al.
2017/0075351 A1*  3/2017   Liu ...................... G05D 1/0011

FOREIGN PATENT DOCUMENTS

JP   2014167413 A   9/2014
JP   2016219941 A   12/2016
(Continued)

OTHER PUBLICATIONS

Notice of Reasons for Refusal dated Aug. 22, 2020 for related Japanese Patent Application, Serial No. 2019-541487.
(Continued)

*Primary Examiner* — Heather R Jones

(57) ABSTRACT

To provide an electronic component capable of performing attitude control of an aircraft in an ex-post manner. An electronic component according to the present disclosure is attachable to an aircraft. The electronic component includes an arm part, an attachment part for attaching to the main body part of the aircraft, and a connecting part for connecting the arm part and the attachment part so that the arm part and the attachment part can be displaced within a predetermined range. The connecting part is connected to a position that coincides with or substantially coincides with the center of gravity of the arm part. Further, when attached to the aircraft, the connecting part coincides with or substantially coincides with the lift generating center of the aircraft.

12 Claims, 25 Drawing Sheets

(51) Int. Cl.
　　　*G03B 15/00*　　　(2021.01)
　　　*G03B 17/56*　　　(2021.01)
　　　*H04N 23/90*　　　(2023.01)
　　　*H04N 23/695*　　(2023.01)
　　　*B64U 10/13*　　　(2023.01)
　　　*B64U 101/30*　　 (2023.01)

(52) U.S. Cl.
　　　CPC ......... *G03B 17/561* (2013.01); *H04N 23/695* (2023.01); *H04N 23/90* (2023.01); *B64U 10/13* (2023.01); *B64U 2101/30* (2023.01)

(56) References Cited

FOREIGN PATENT DOCUMENTS

| | | |
|---|---|---|
| JP | 2017193208 A | 10/2017 |
| JP | 2017193331 A | 10/2017 |

OTHER PUBLICATIONS

Notice of Reasons for Refusal dated Oct. 10, 2020 for related Japanese Patent Application, Serial No. 2019-541487.
Notification of reasons for refusal dated Nov. 10, 2022 for Japanese Patent Application No. 2019-198729.

\* cited by examiner

[FIG. 1]
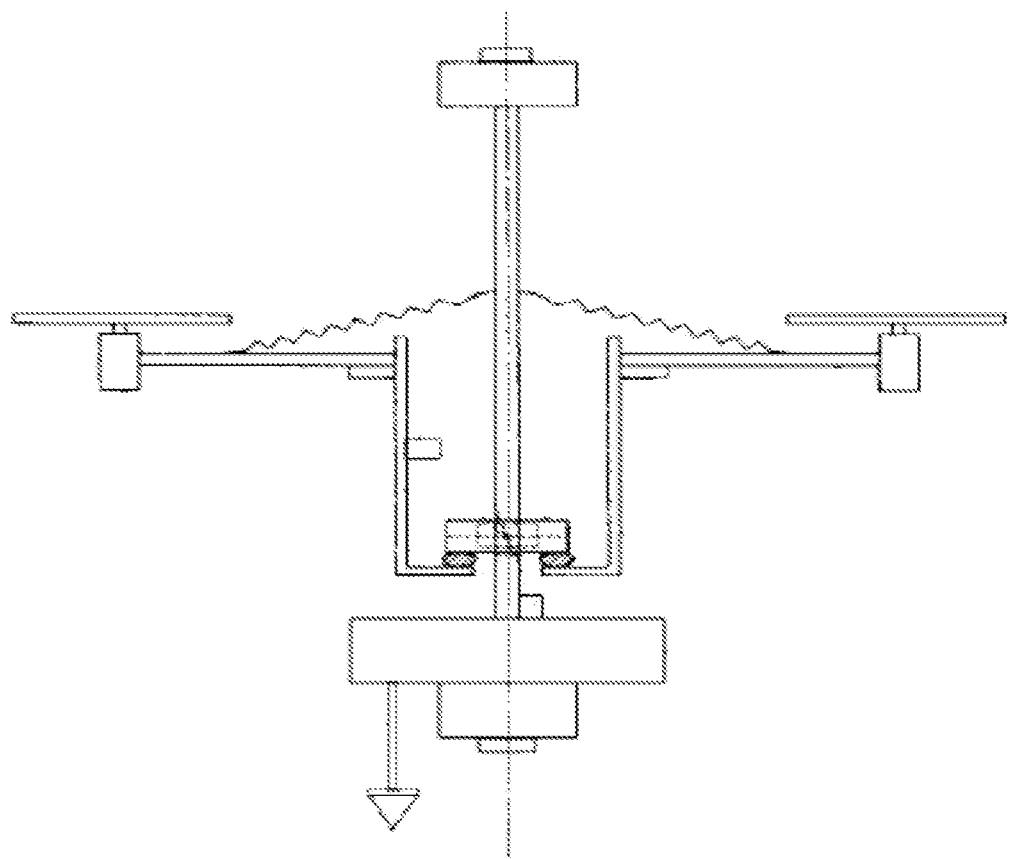

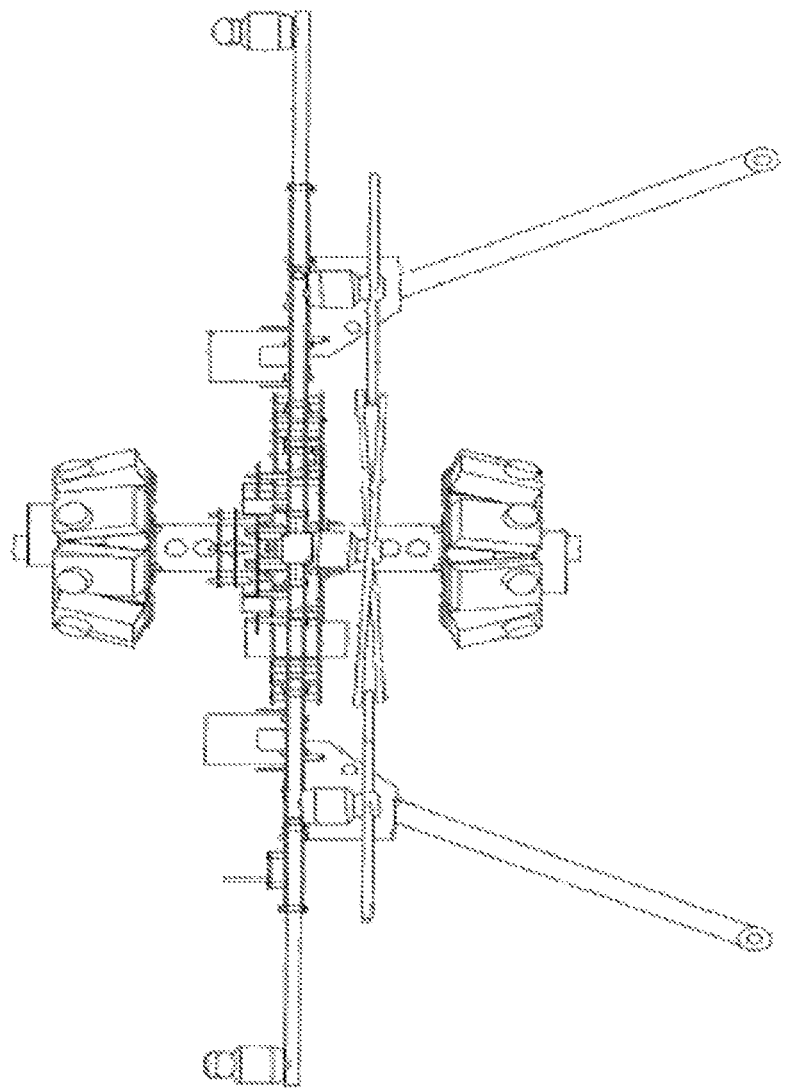
[FIG. 2]

[FIG. 3]
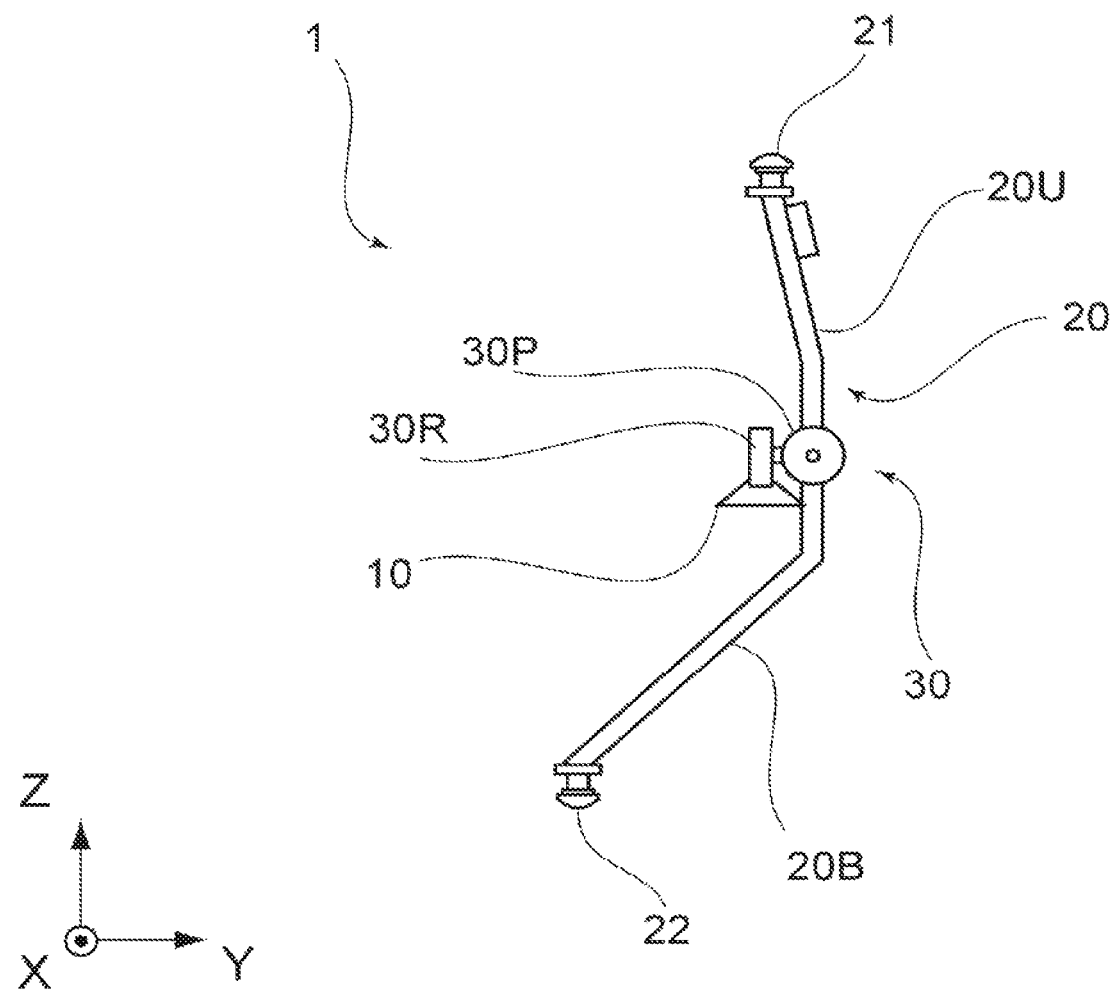

[FIG. 4]
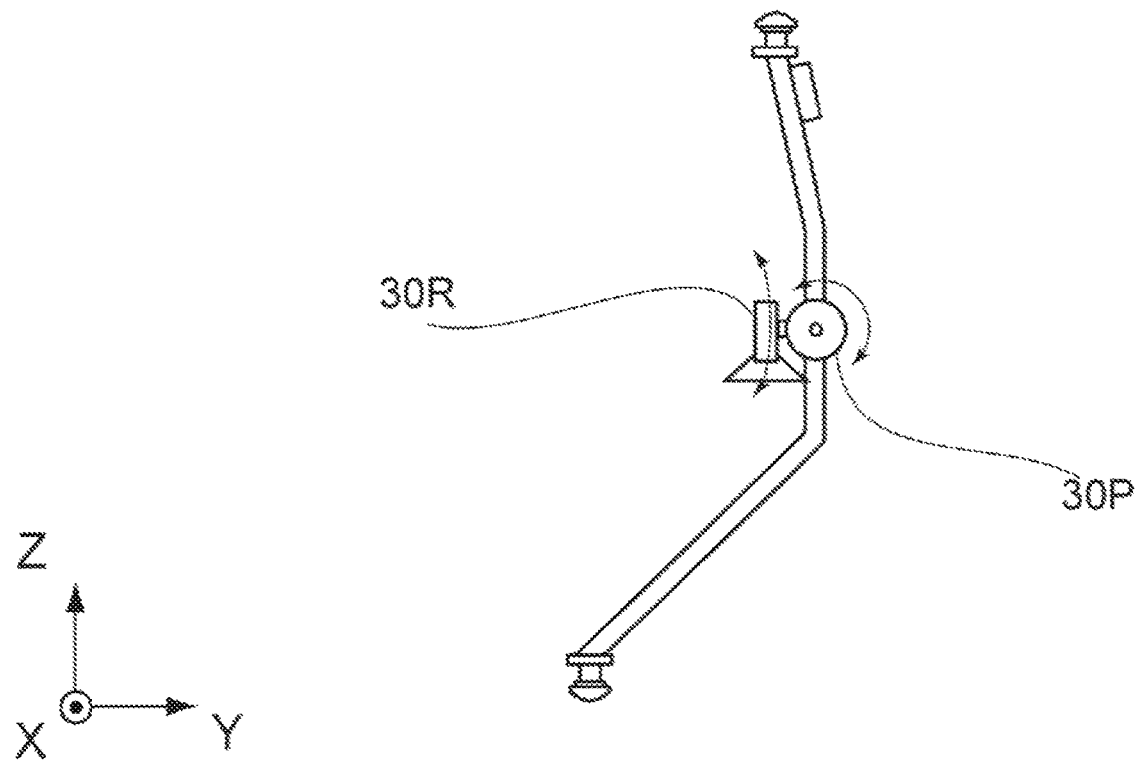

[FIG. 5]
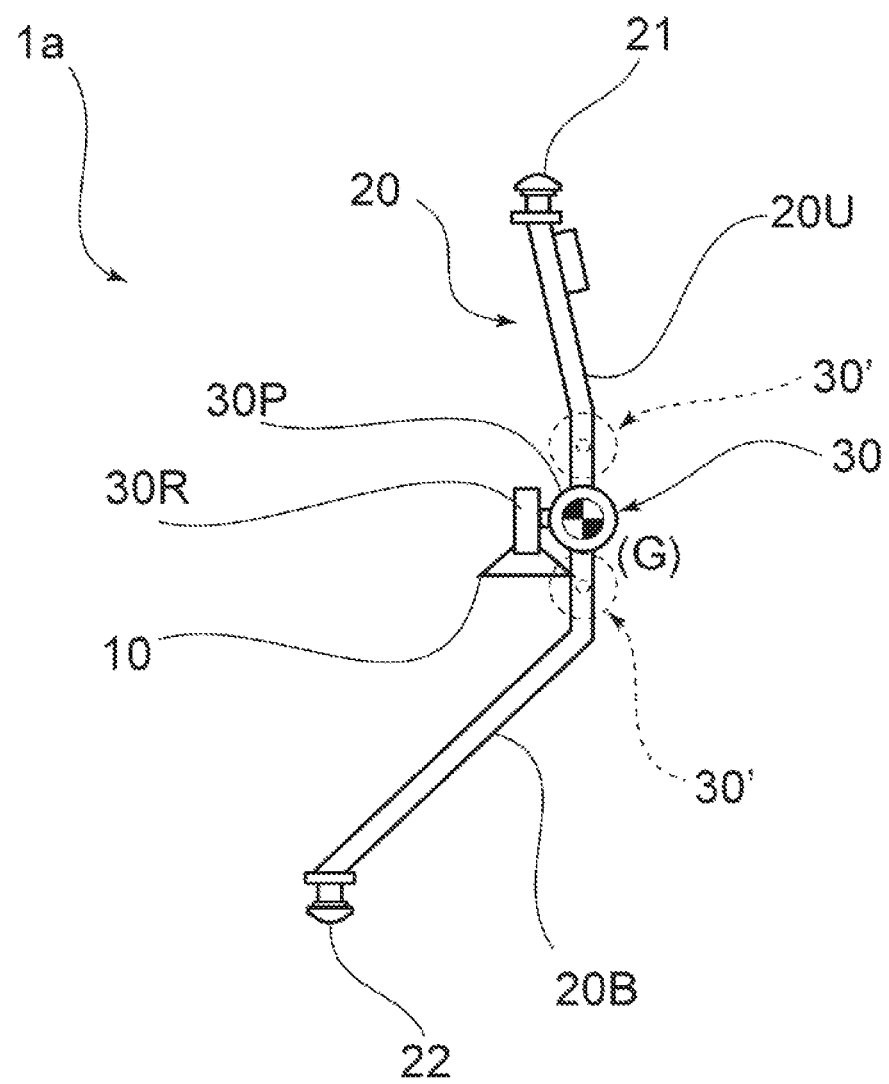

[FIG. 6]
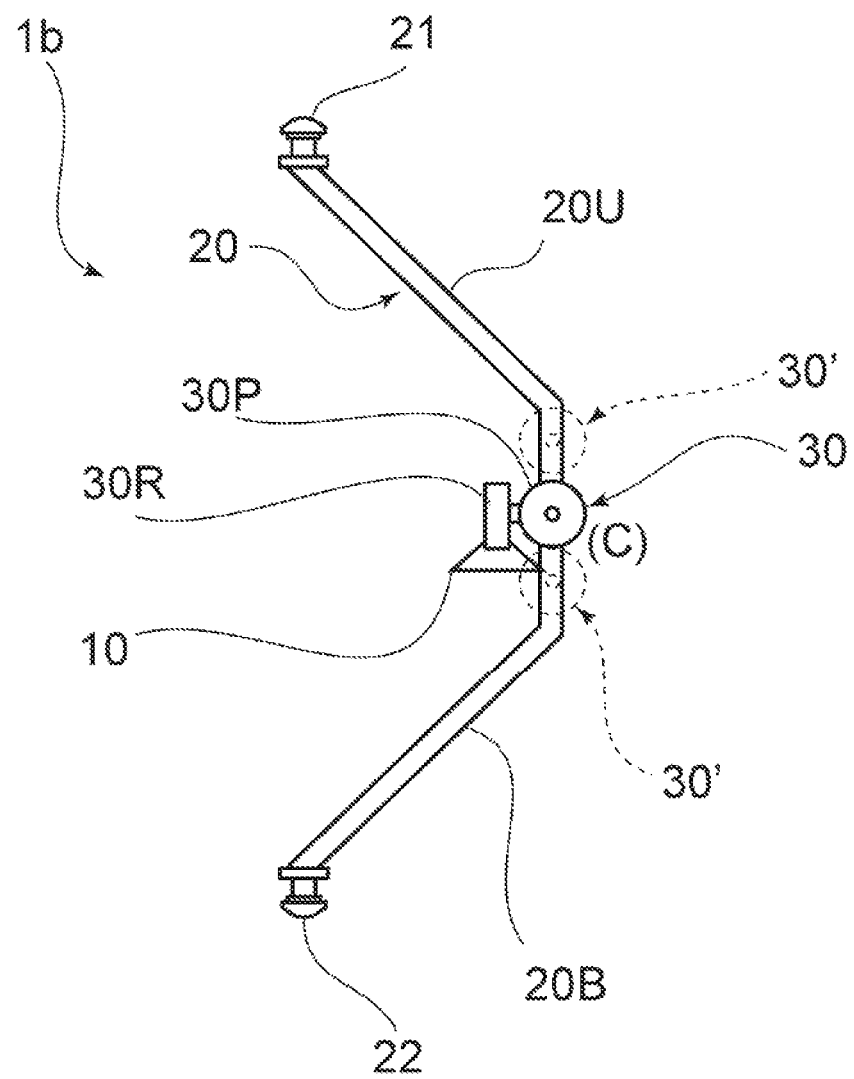

[FIG. 7]
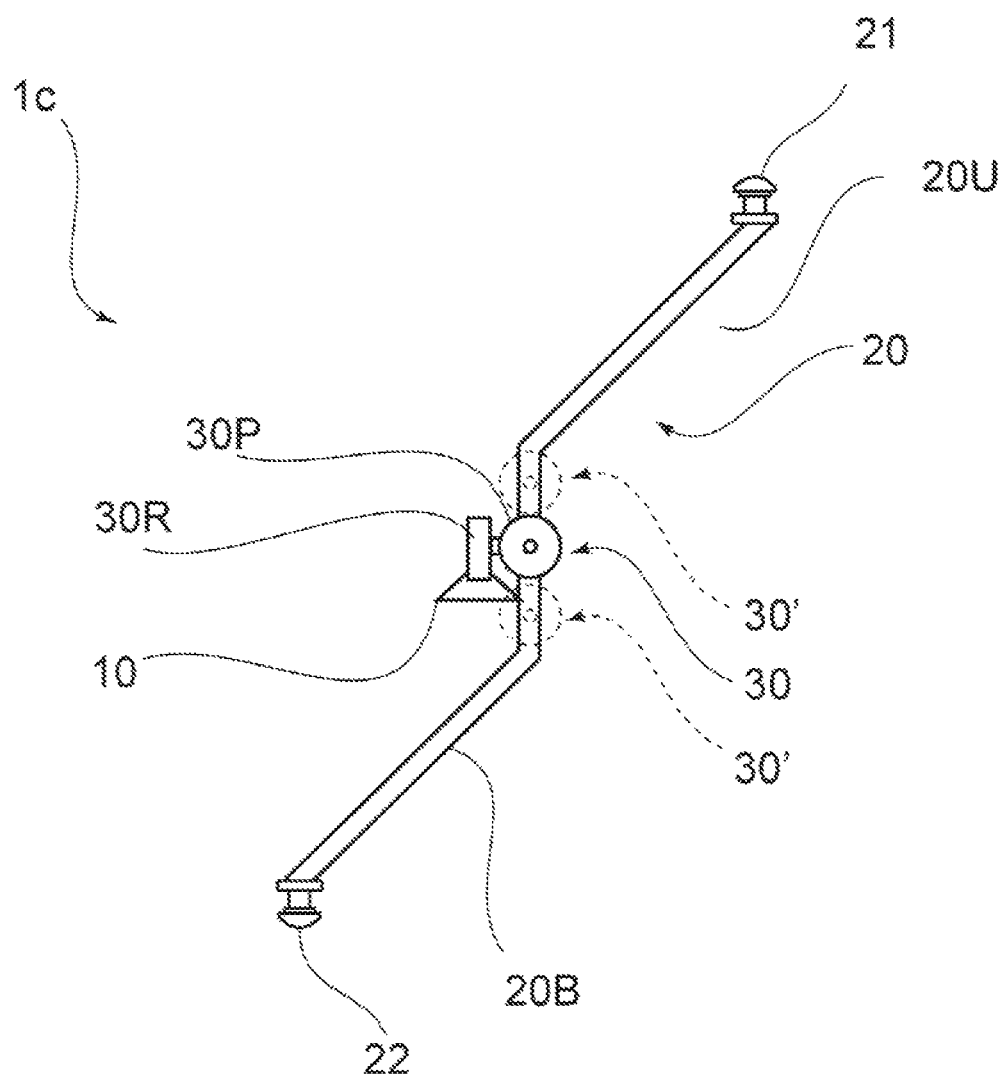

[FIG. 8]
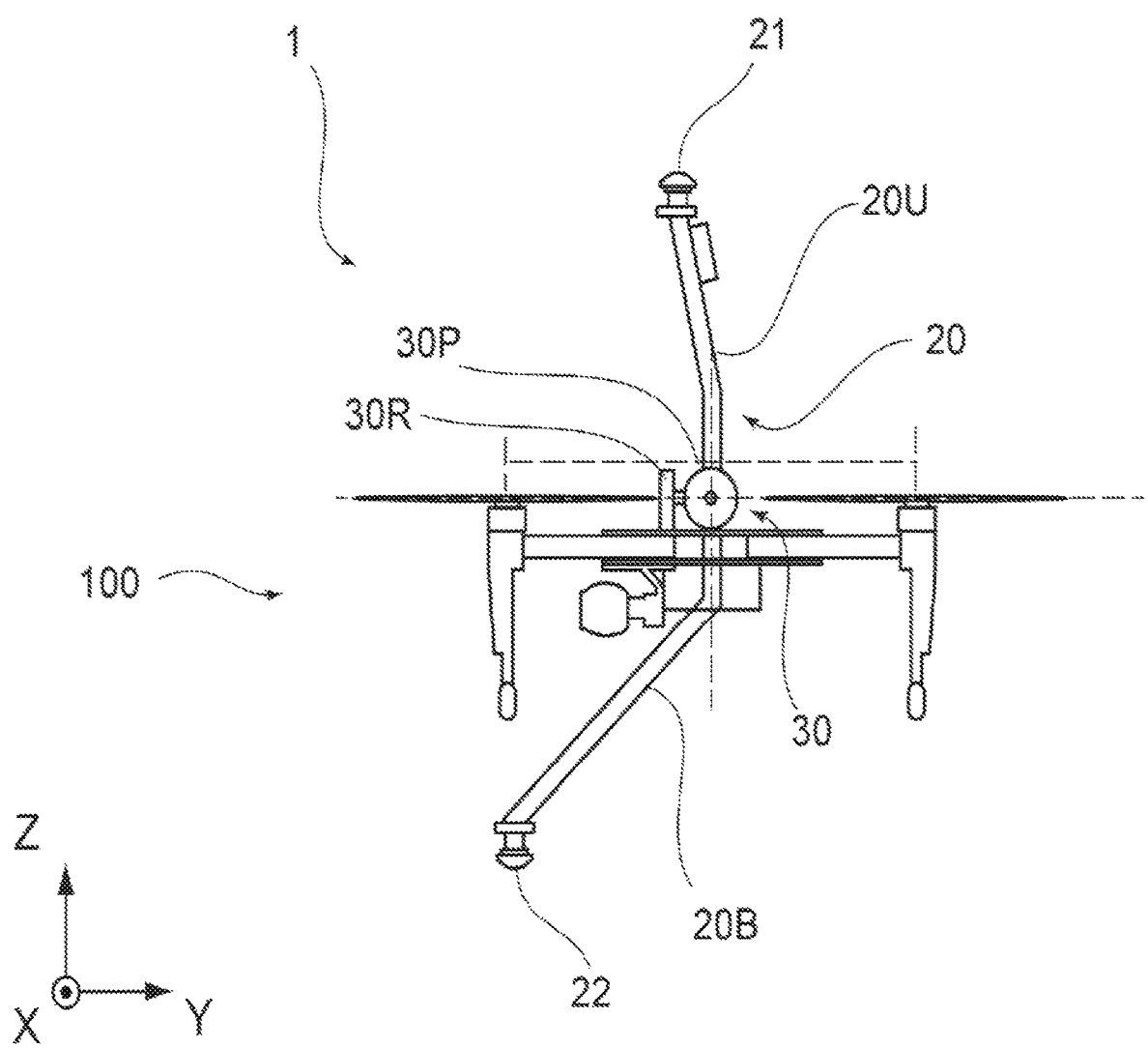

[FIG. 9]
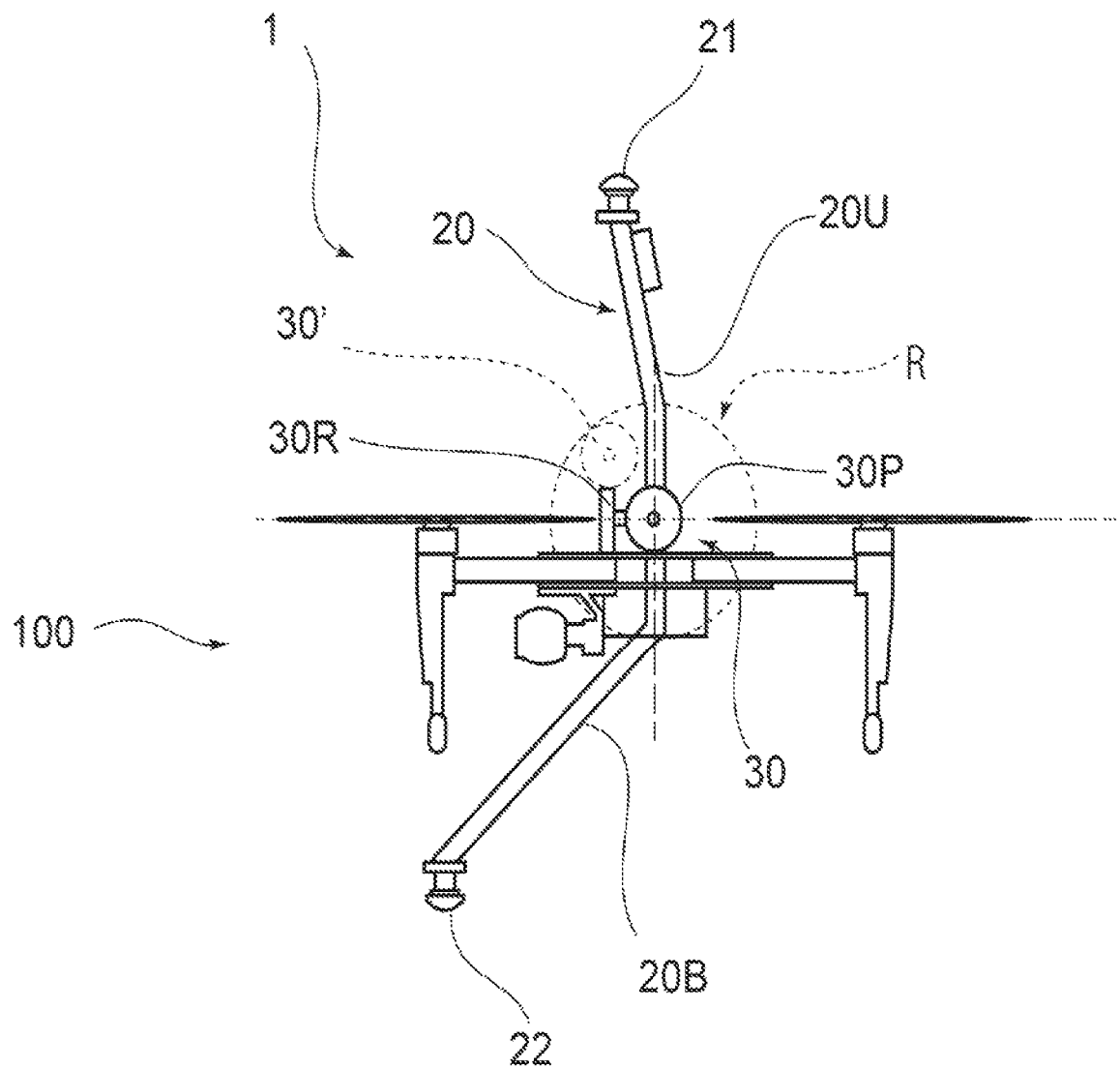

[FIG. 10]
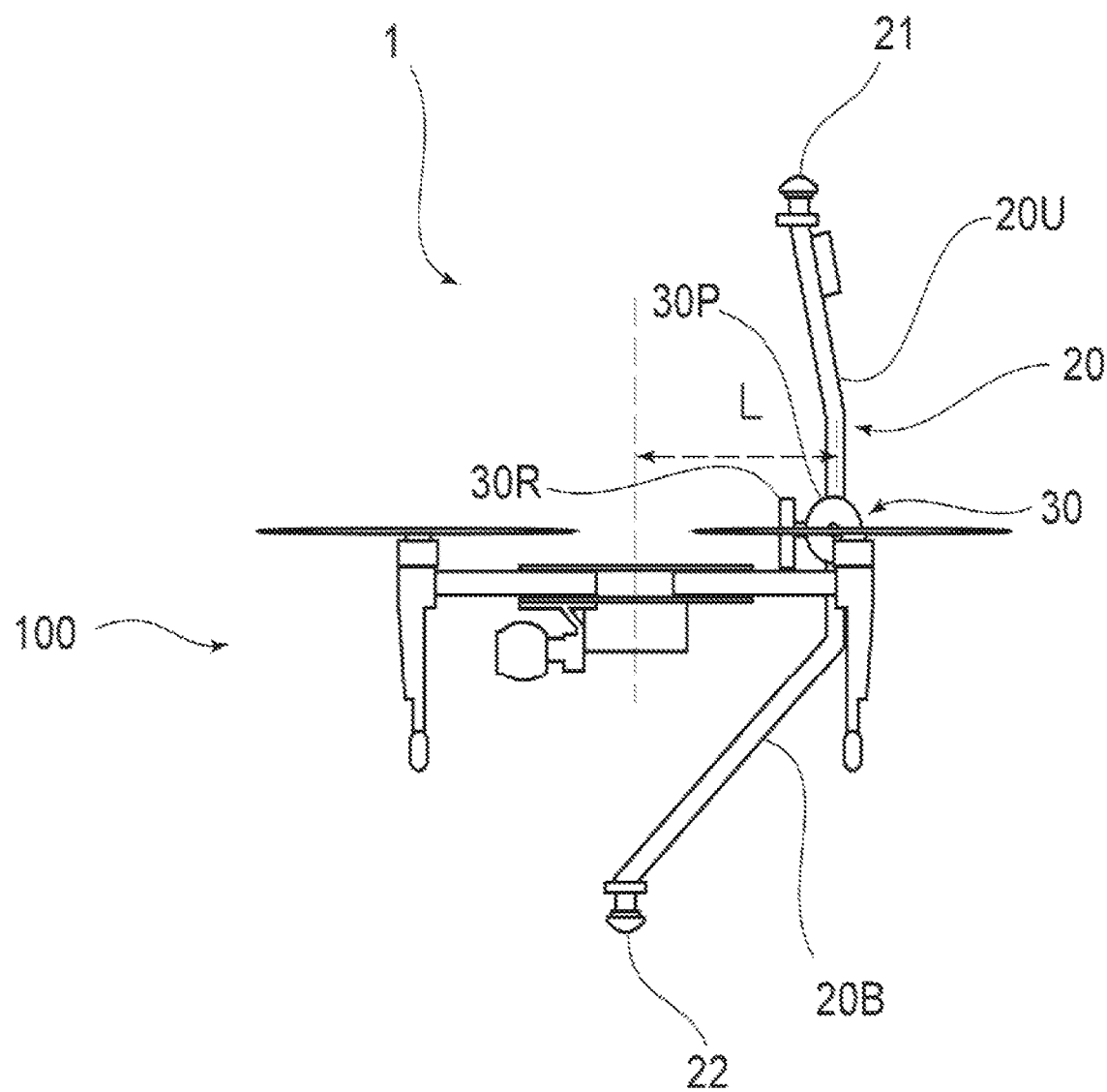

[FIG. 11]
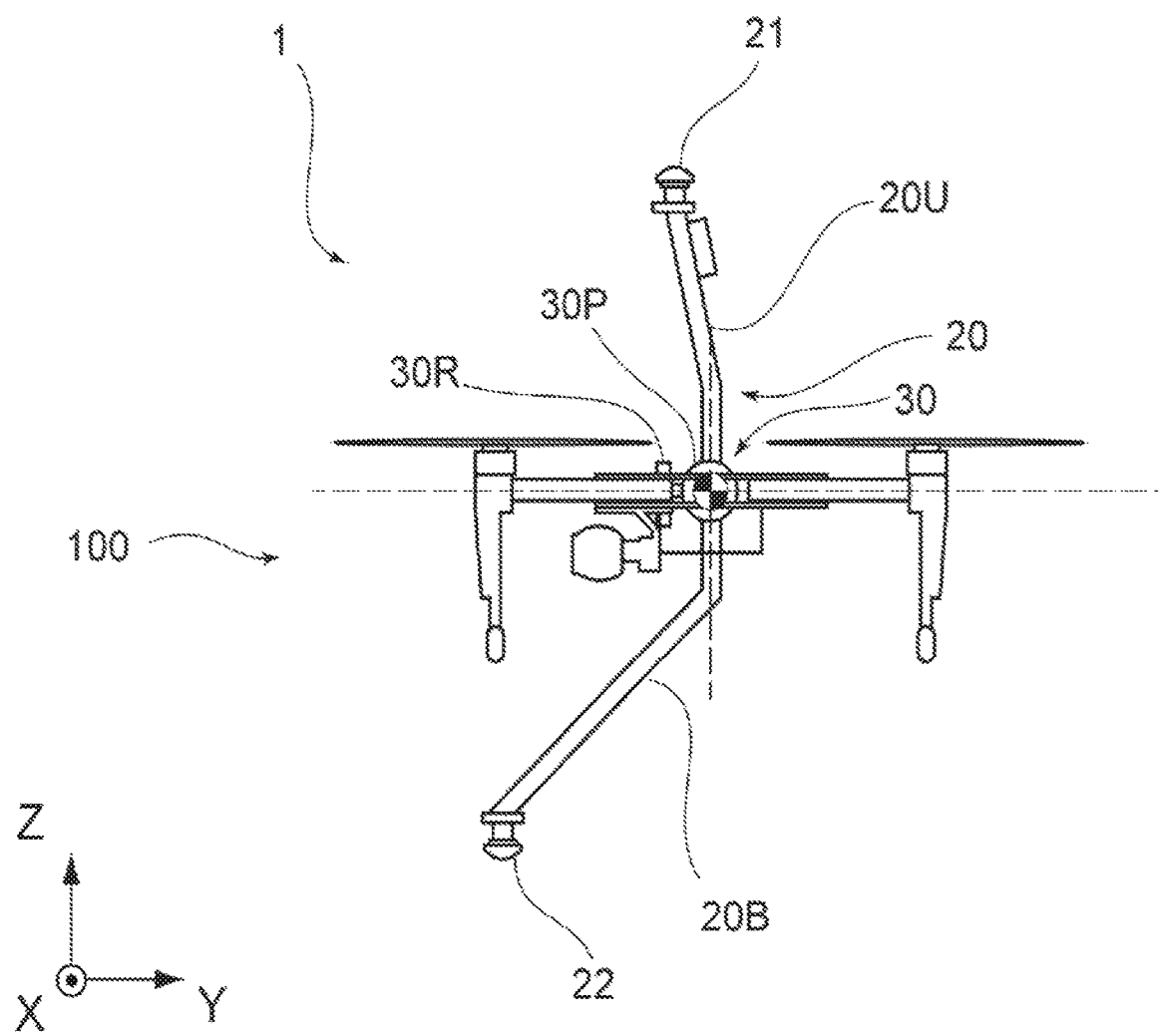

[FIG. 12]
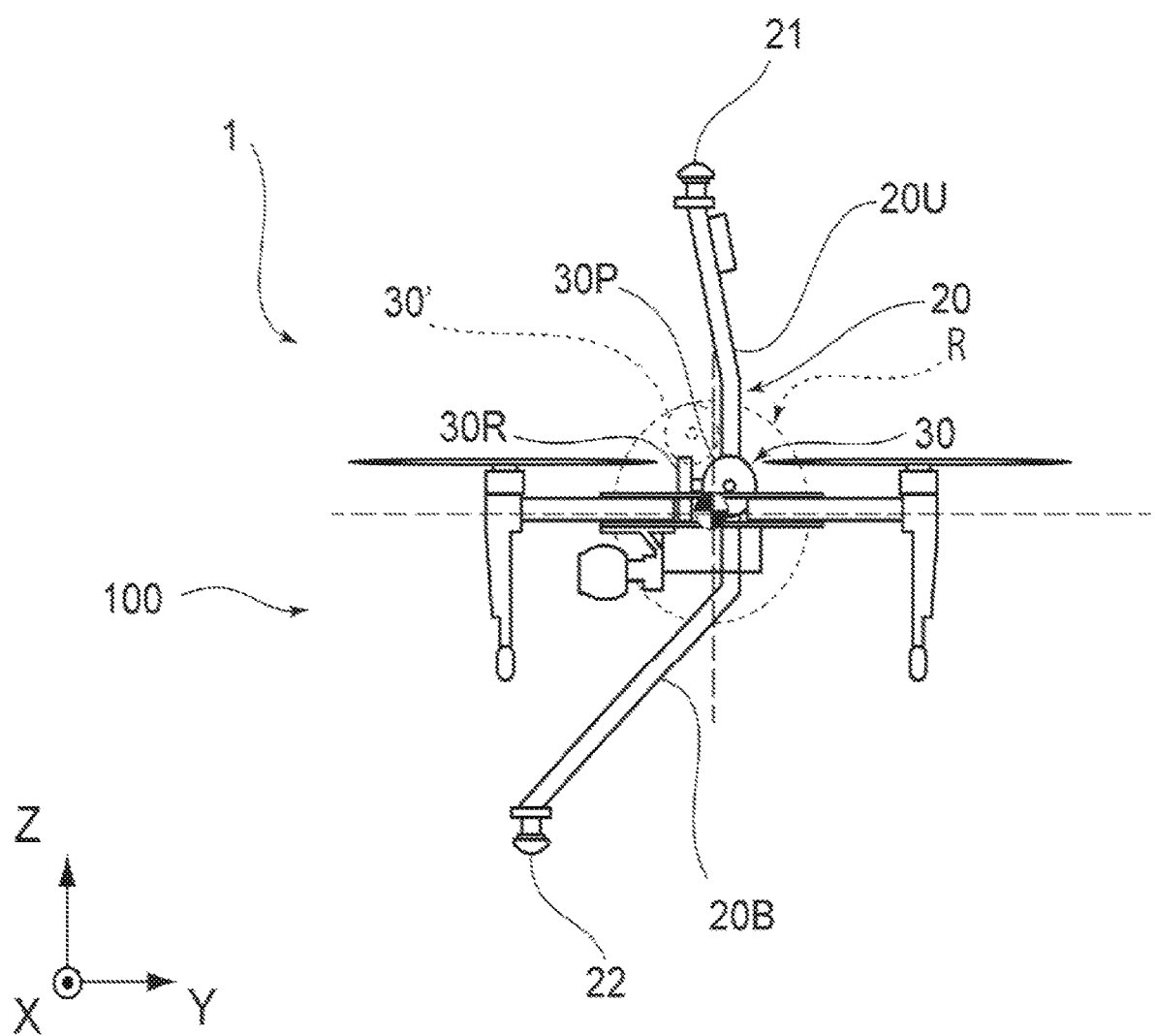

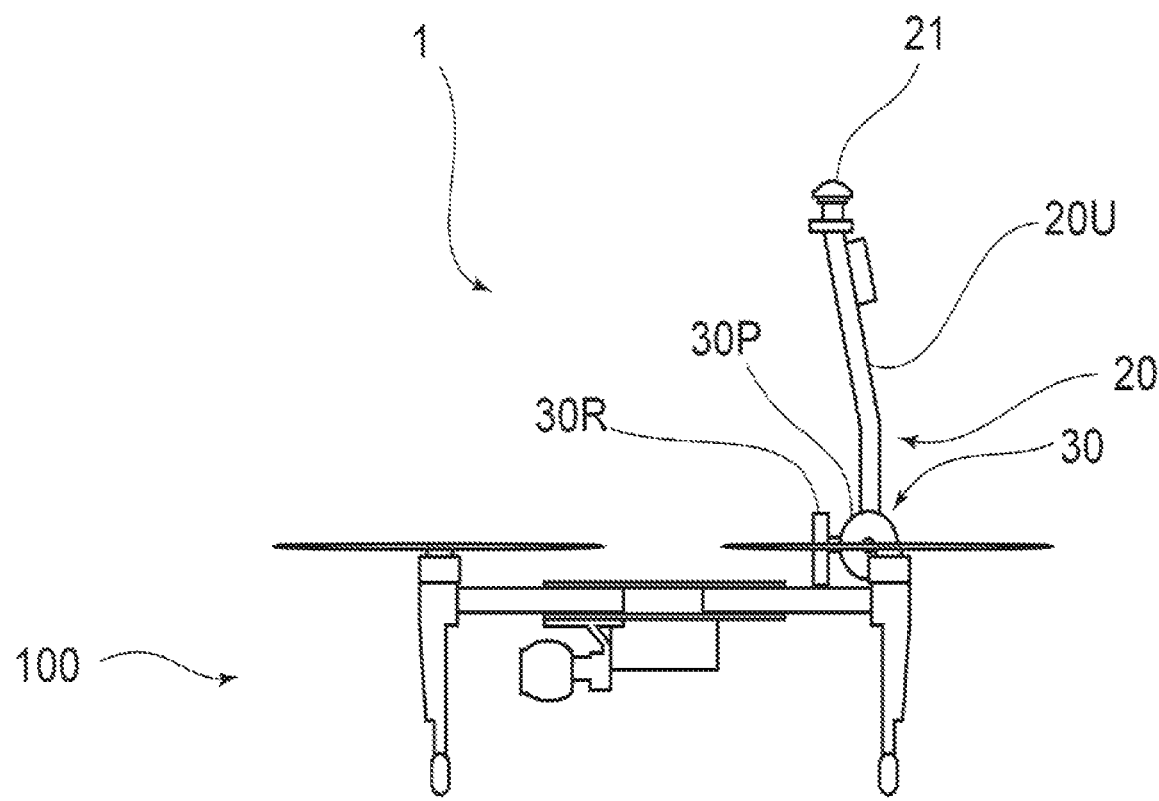
[FIG. 13]

[FIG. 14]
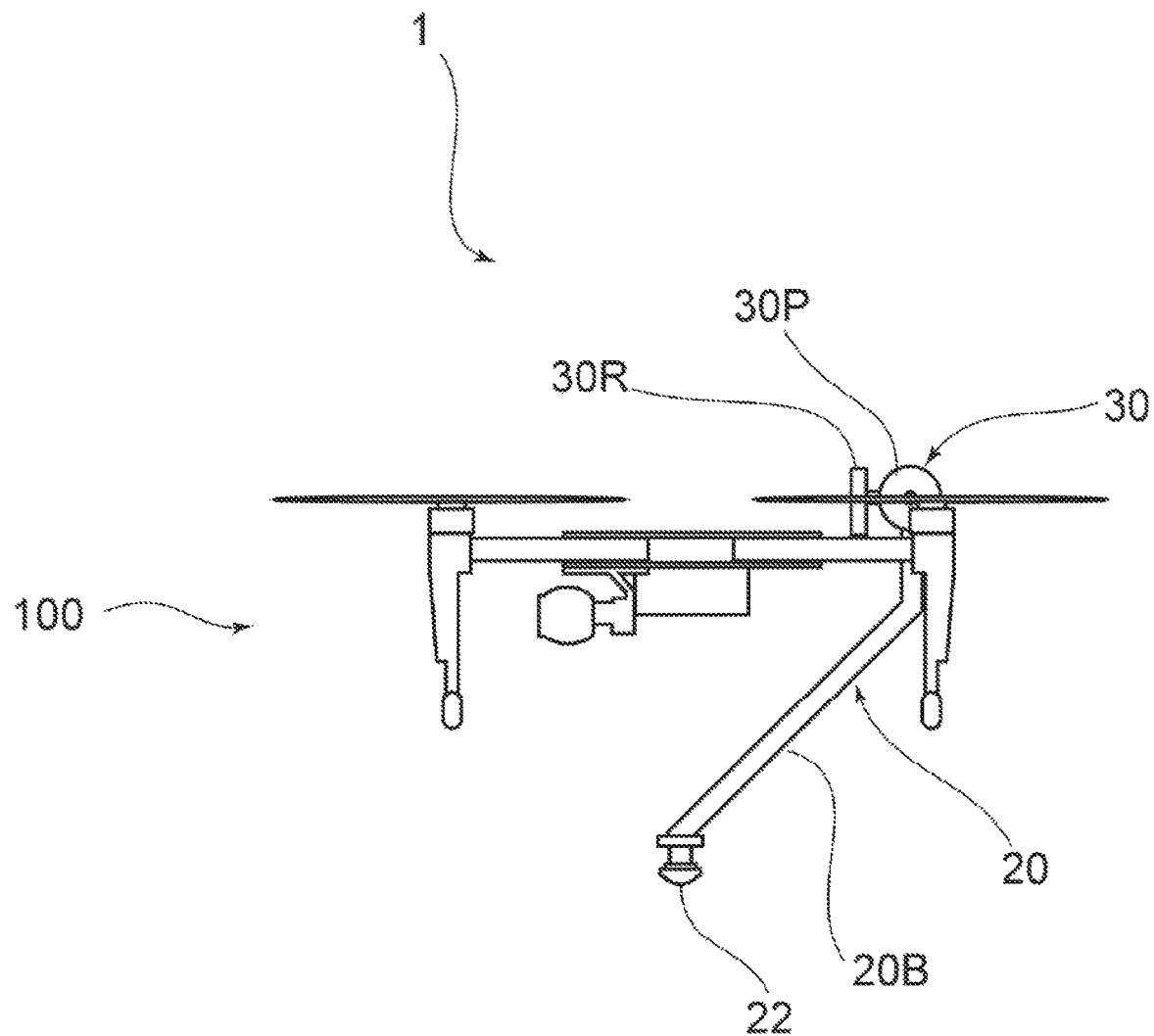

[FIG. 15]
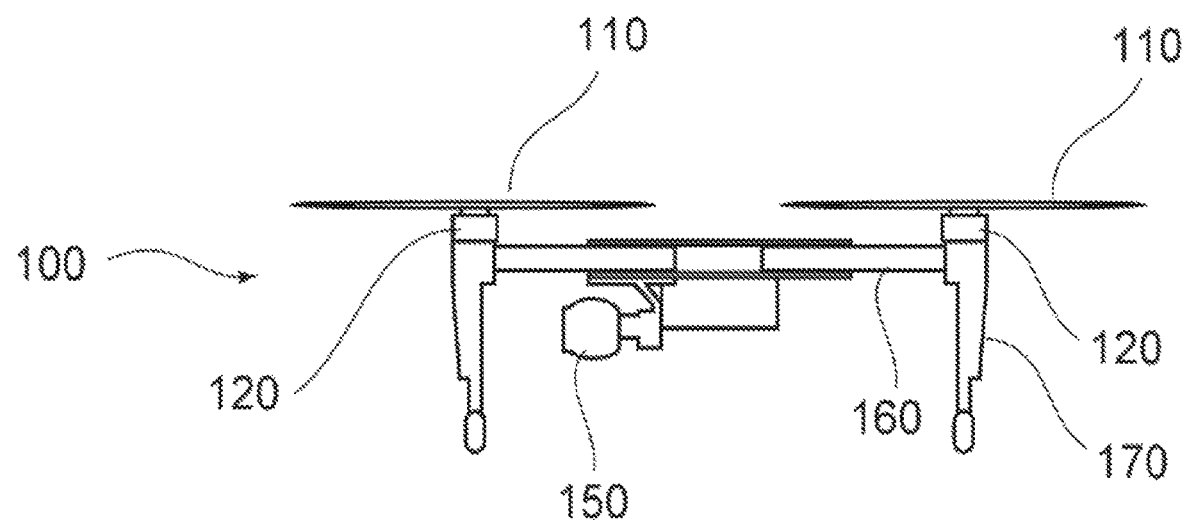

[FIG. 16]
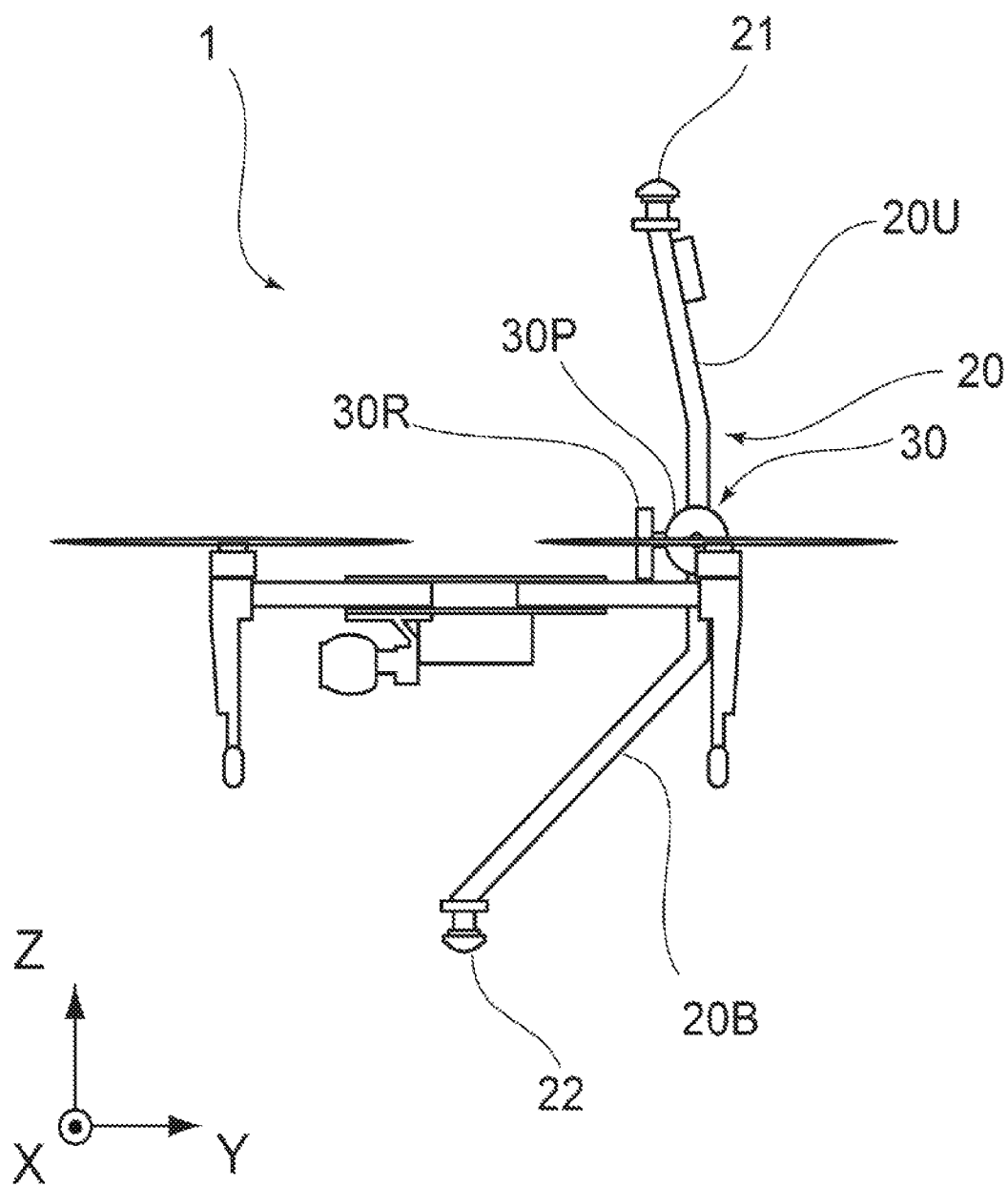

[FIG. 17]
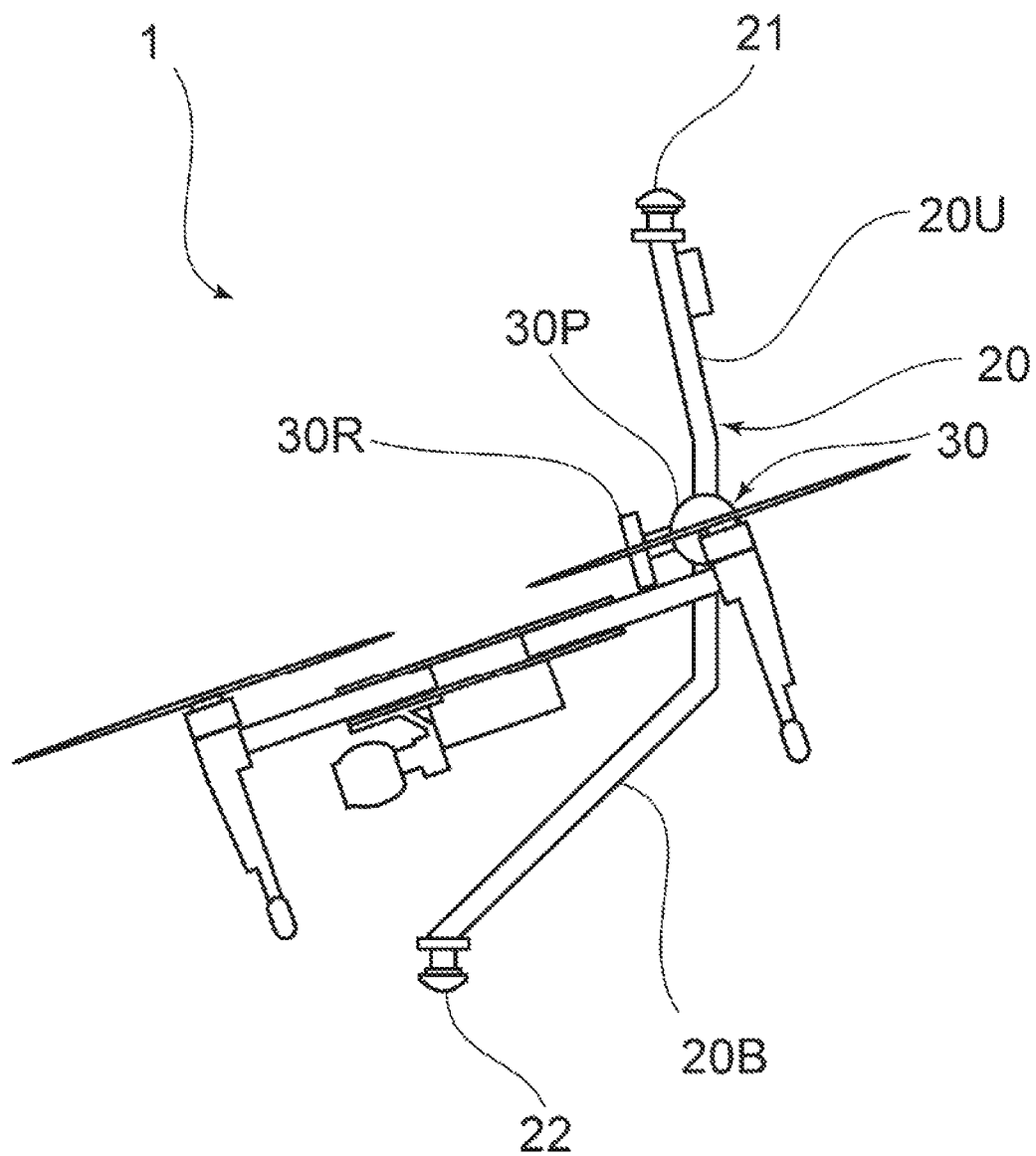

[FIG. 18]
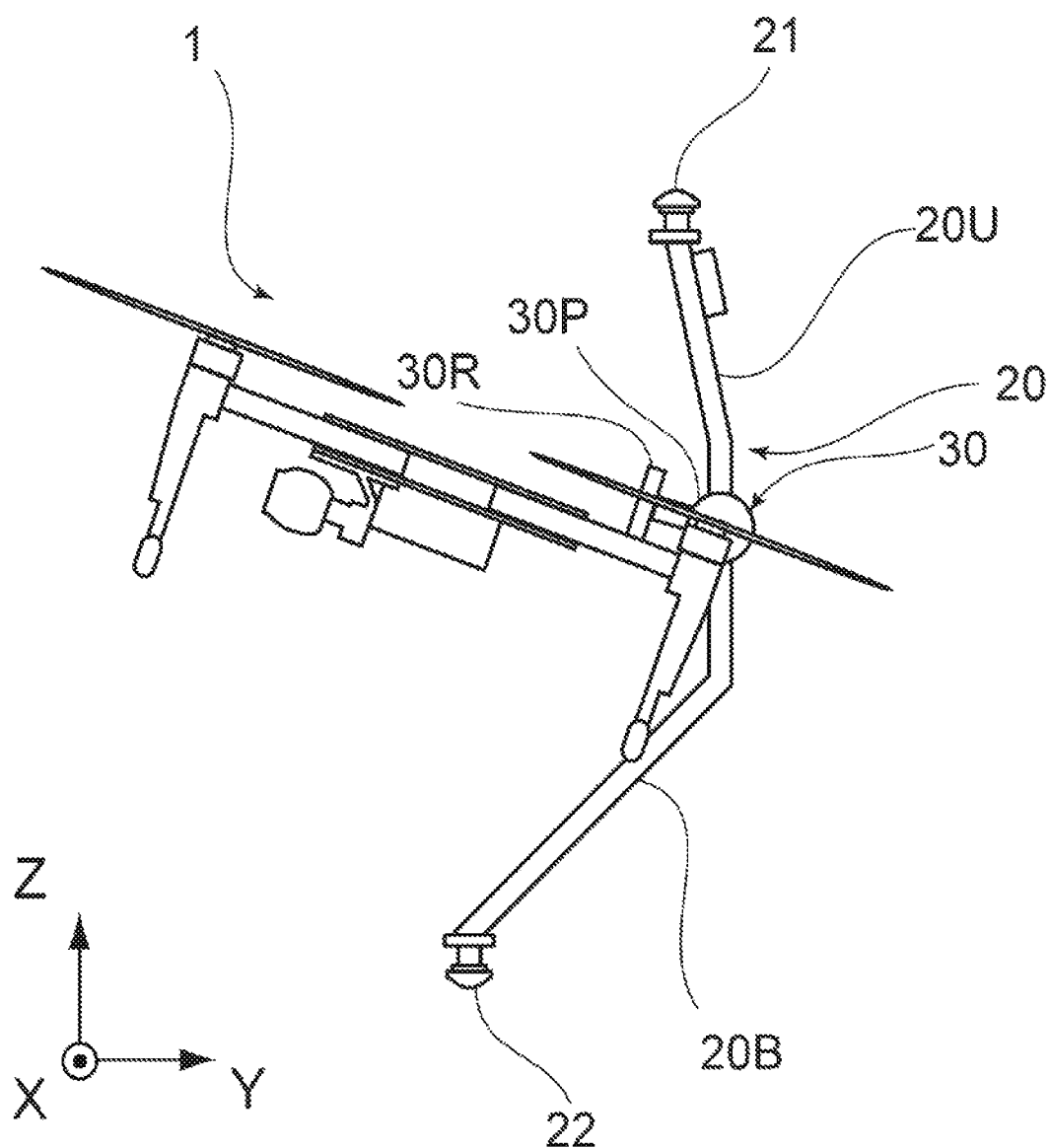

[FIG. 19]
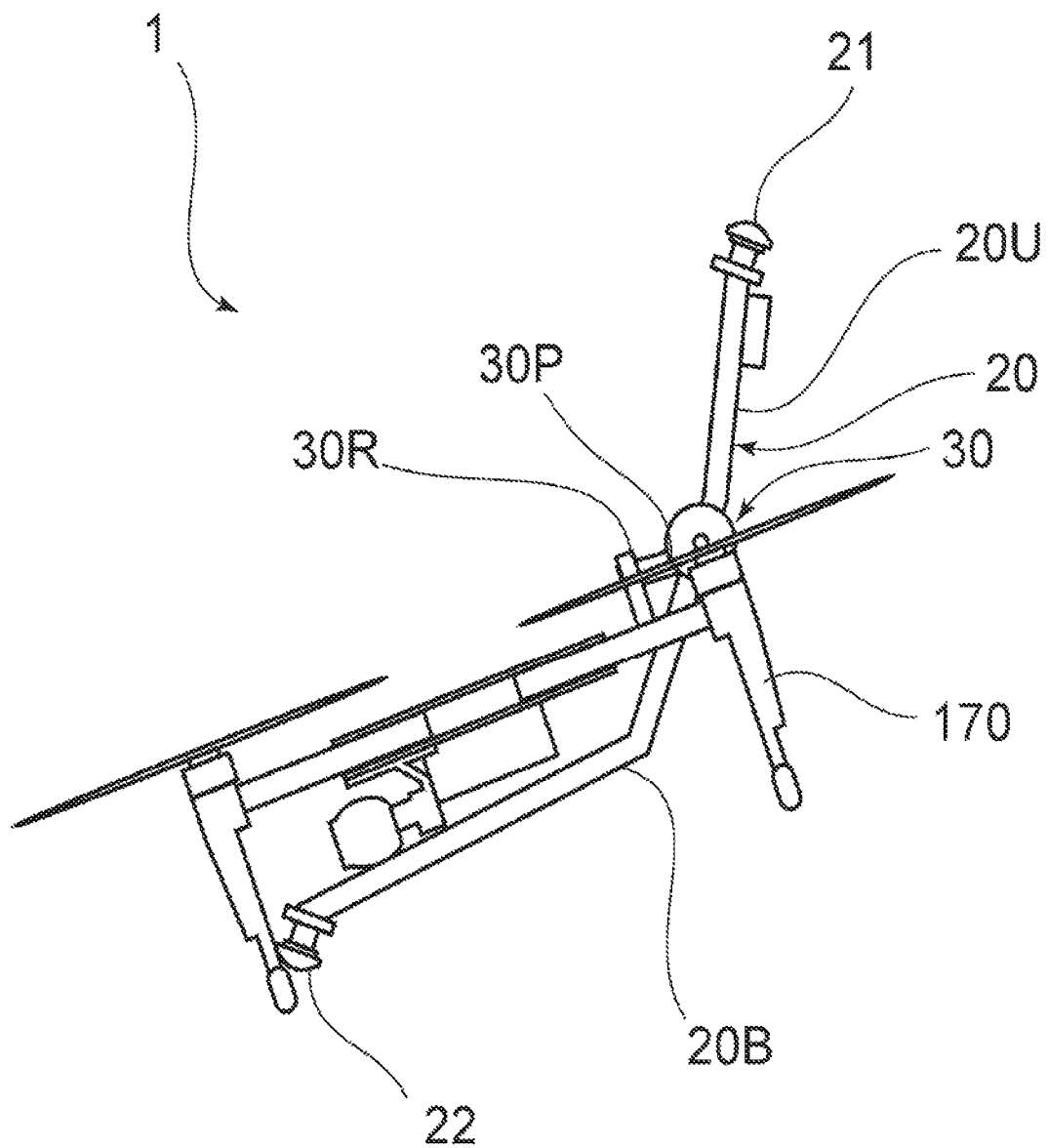

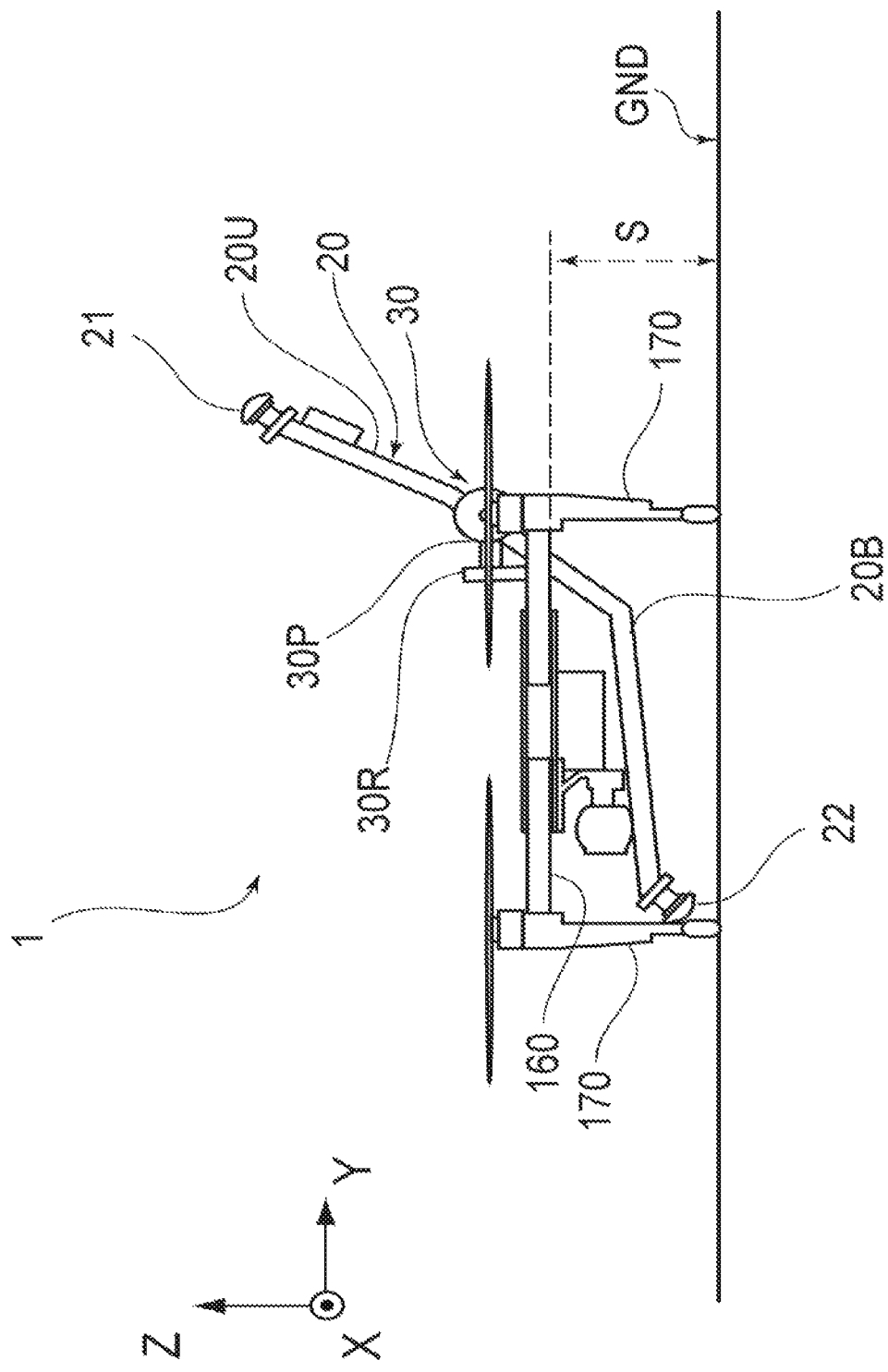
[FIG. 20]

[FIG. 21]
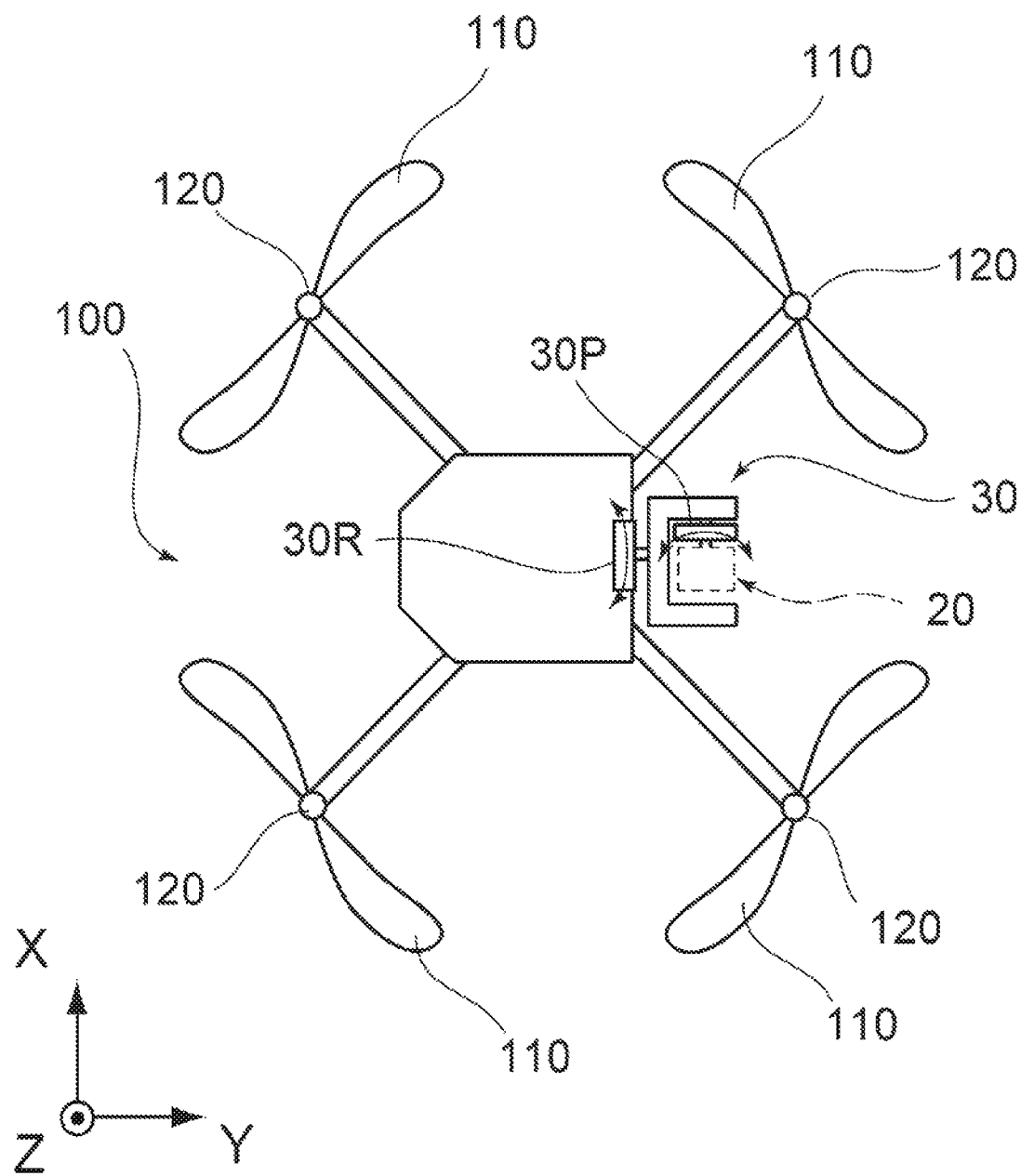

[FIG. 22]
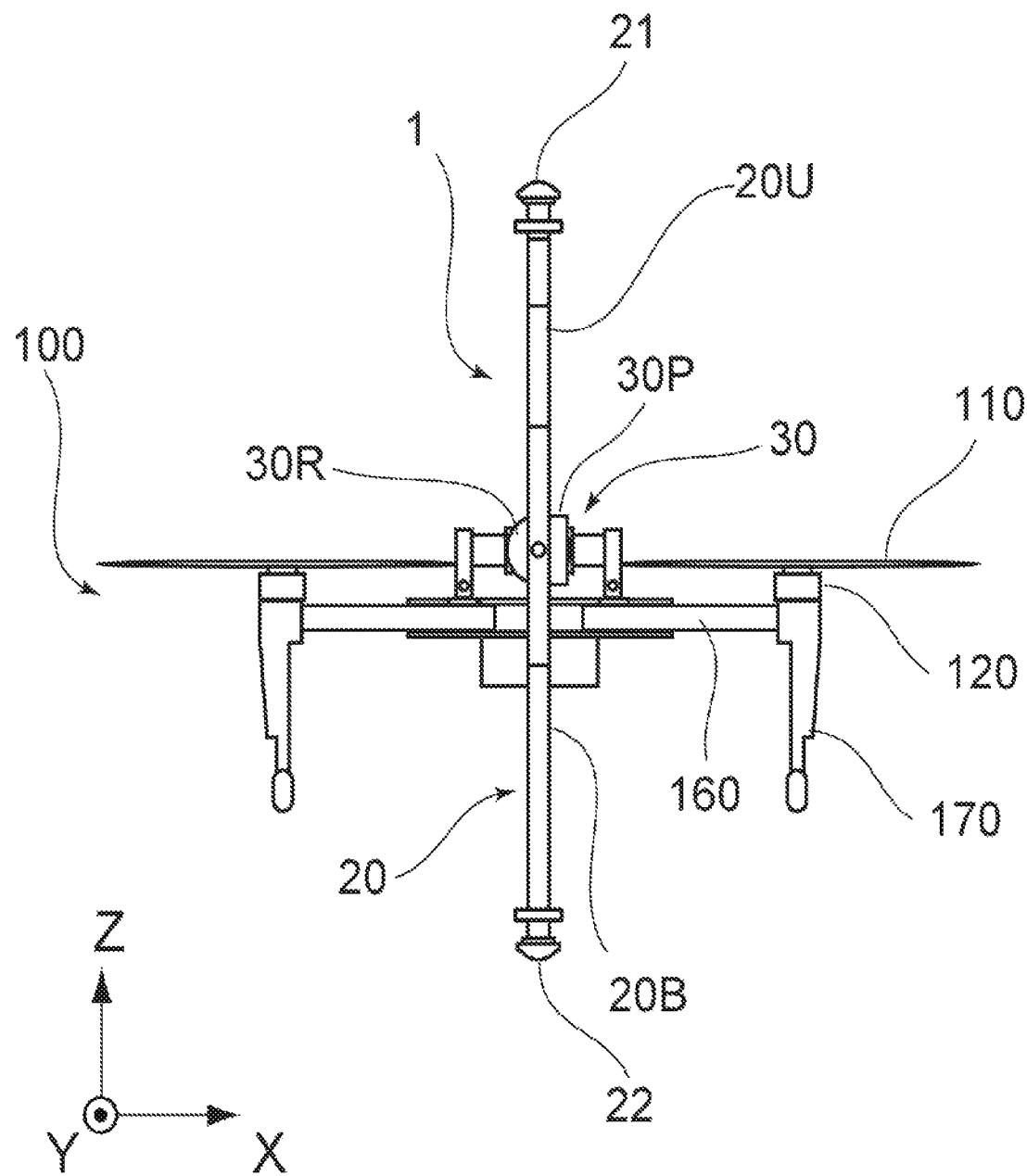

[FIG. 23]
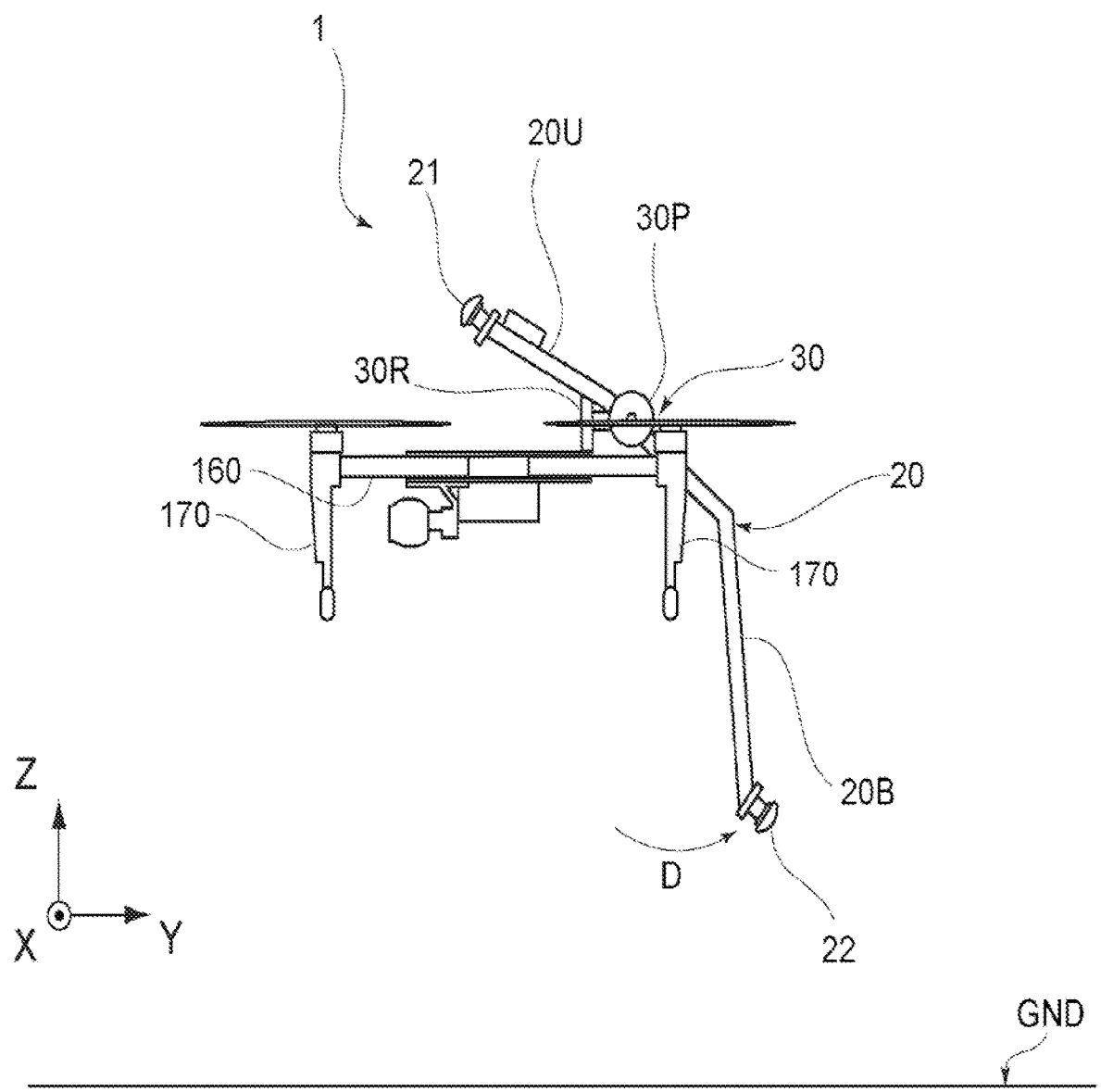

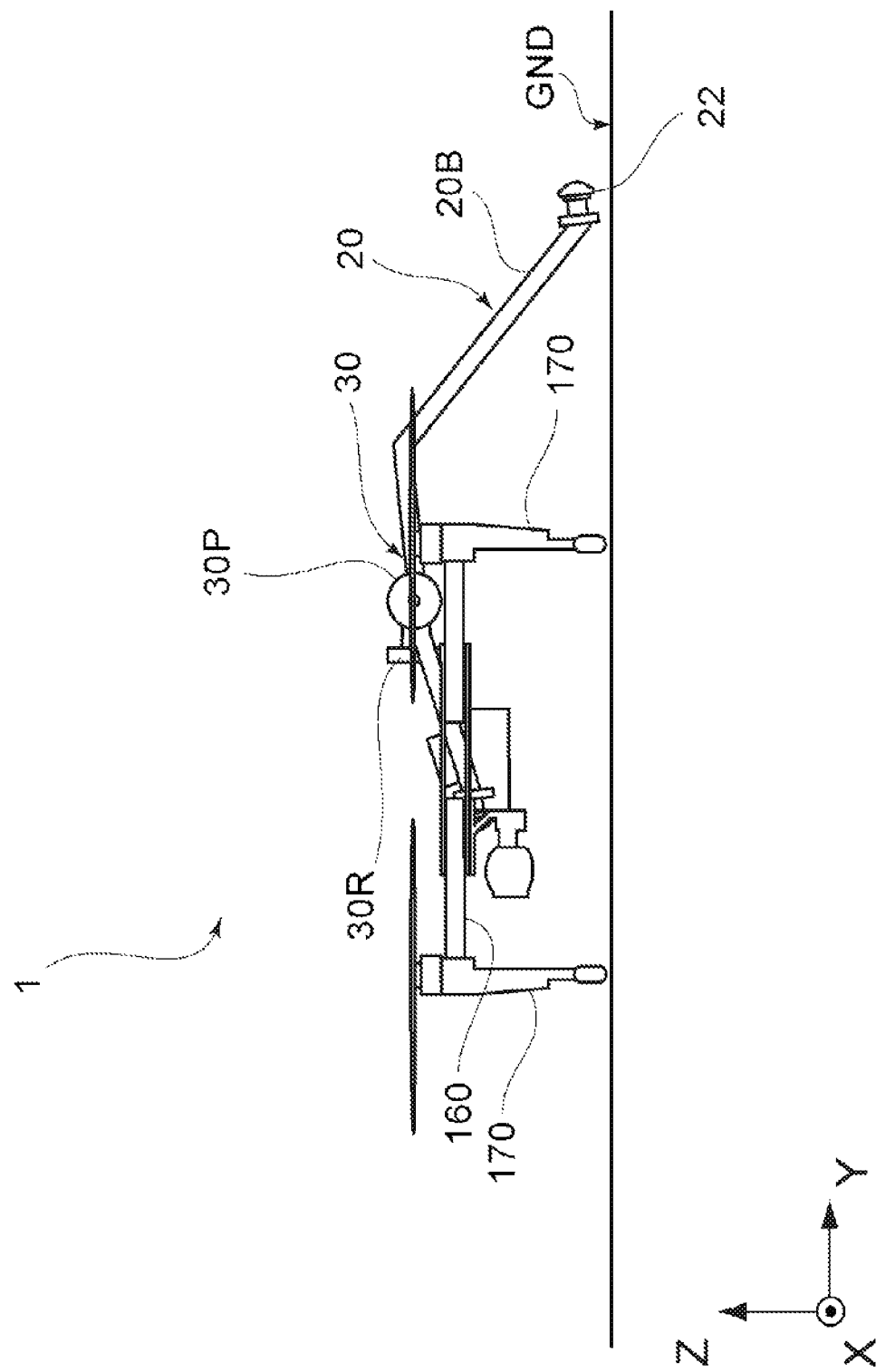
[FIG. 24]

[FIG. 25]
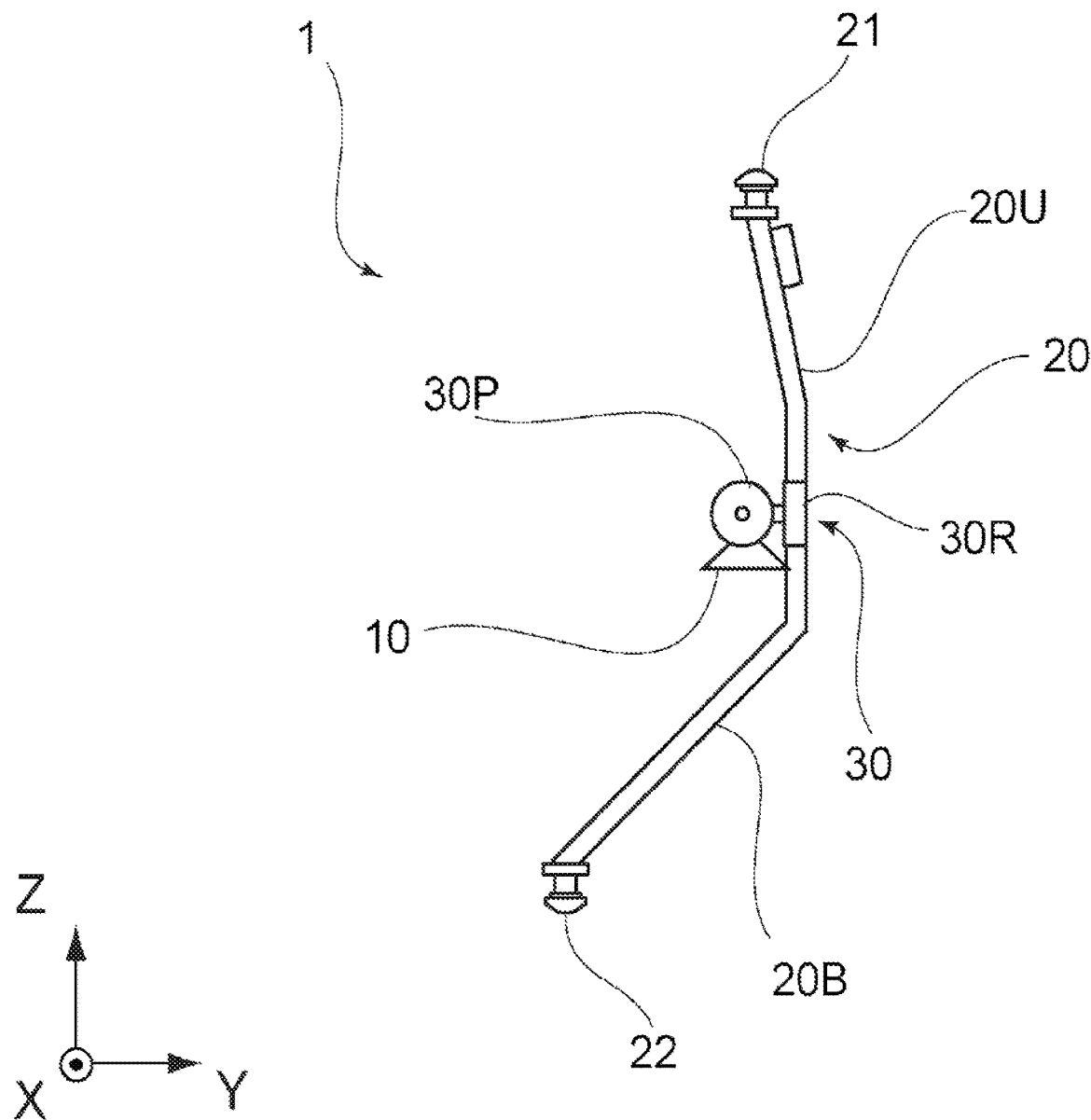

ELECTRONIC COMPONENT AND AIRCRAFT WITH ELECTRONIC COMPONENT ATTACHED THERETO

TECHNICAL FIELD

The present disclosure relates to an electronic component and an electronic component that can be attached to an aircraft.

BACKGROUND ART

In recent years, attempts have been made to deliver loads using an aircraft such as a drone or an unmanned aerial vehicle (UAV). In Patent Document 1, a delivery system using an aircraft is disclosed (for example, refer to Patent Document 1).

Aerial photography systems capable of stably shooting images vertically downward or upward regardless of the attitude of a small aircraft are also provided (for example, refer to Patent Documents 2 and 3). As shown in FIGS. 1 and 2, the aircraft has a camera supported via a gimbal so as to tilt freely in an arbitrary direction.

PRIOR ART

Patent Literature

Patent Document 1: United States Patent Publication No. 2015-0120094 A1
Patent Document 2: Japanese Unexamined Patent Application Publication No. 2014-167413
Patent Document 3: Japanese Unexamined Patent Application Publication No. 2016-219941

SUMMARY OF THE INVENTION

Technical Problem

Both technologies disclosed in Patent Documents 2 and 3 have structures that assist attitude control of an aircraft, but the aircraft itself must be manufactured from the start, the versatility is low, and it is costly.

Accordingly, it is an object of the present disclosure to provide an electronic component capable of performing attitude control of an aircraft in an ex-post manner and the aircraft on which the electronic component is attached.

Technical Solution

According to the present disclosure, an electronic component attachable to an aircraft can be obtained, wherein the electronic component includes,
an arm part,
an attachment part to be attached to a main body part of the aircraft, and
a connecting part for connecting the arm part and the attachment part so as to be displaceable within a predetermined range.

Advantageous Effects

According to the present disclosure, it is possible to provide an electronic component capable of performing attitude control of an aircraft in an ex-post manner and the aircraft on which the electronic component is attached.

BRIEF DESCRIPTION OF THE DRAWINGS

FIG. 1 is a diagram of a conventional aircraft.
FIG. 2 is a diagram of another conventional aircraft.
FIG. 3 is a diagram of an electronic component according to a first embodiment of the present disclosure.
FIG. 4 is a view illustrating a movable direction of a gimbal of the electronic component of FIG. 3.
FIG. 5 is a view of an electronic component according to a second embodiment of the present disclosure.
FIG. 6 is a diagram of an electronic component according to a third embodiment of the present disclosure.
FIG. 7 is a diagram of an electronic component according to a fourth embodiment of the present disclosure.
FIG. 8 is a view illustrating a state where the electronic component of FIG. 3 is attached to an aircraft by a first attachment method.
FIG. 9 is a view illustrating a state where the electronic component of FIG. 3 is attached to an aircraft by a second attachment method.
FIG. 10 is a view illustrating a state where the electronic component of FIG. 3 is attached to an aircraft by a third attachment method.
FIG. 11 is a view illustrating a state where the electronic component of FIG. 3 is attached to an aircraft by a fourth attachment method.
FIG. 12 is a view illustrating a state where the electronic component of FIG. 3 is attached to an aircraft by a fifth attachment method.
FIG. 13 is a view illustrating a state where the electronic component according to a fifth embodiment is attached to an aircraft by a sixth attachment method.
FIG. 14 is a view illustrating a state where the electronic component according to a sixth embodiment is attached to an aircraft by a seventh attachment method.
FIG. 15 is a view of an aircraft for attaching the electronic component of FIG. 3.
FIG. 16 is a view of the aircraft attached with the electronic component of FIG. 3 when hovering.
FIG. 17 is a view of the aircraft attached with the electronic component of FIG. 3 when moving forward.
FIG. 18 is a view of the aircraft attached with the electronic component of FIG. 3 when moving backward.
FIG. 19 is a view of the aircraft attached with the electronic component of FIG. 3 when descending.
FIG. 20 is a view of the aircraft attached with the electronic component of FIG. 3 when landing.
FIG. 21 is a top view of the aircraft attached with the electronic component of FIG. 3 when landing.
FIG. 22 is a side view of the aircraft attached with the electronic component of FIG. 3.
FIG. 23 is a modified example of an aircraft attached with the electronic component of FIG. 3 when landing.
FIG. 24 is a modified example of an aircraft attached with the electronic component of FIG. 3 when landing.
FIG. 25 is a modified example of an electronic component of FIG. 3.

DETAILED DESCRIPTION OF THE INVENTION

The contents of the embodiment of the present disclosure will be listed and described. An electronic component according to an embodiment of the present disclosure has the following configuration.
[Item 1]

An electronic component attachable to an aircraft, the electronic component including:
  an arm part,
  an attachment part to be attached to a main body part of the aircraft, and
  a connecting part for connecting the arm part and the attachment part so as to be displaceable within a predetermined range.

[Item 2]

The electronic component according to Item 1,
  wherein the connecting part is connected to a position that coincides with or substantially coincides with the center of gravity of the arm part.

[Item 3]

The electronic component as set forth in Item 1 or 2,
  wherein the connecting part is connected to a position at the center or substantially the center of the arm part.

[Item 4]

The electronic component as set forth in any one of Items 1 to 3,
  wherein a shape of the arm part is point-symmetric or substantially point-symmetric with respect to the connecting part.

[Item 5]

The electronic component as set forth in any one of Items 1 to 4,
  wherein in a state attached to the aircraft, the connecting part is configured to be at a position that coincides with or substantially coincides with a lift generating center of the aircraft.

[Item 6]

The electronic component as set forth in any one of Items 1 to 4,
  wherein in a state attached to the aircraft, the connecting part is configured to be at a position within a predetermined range from a lift generating center of the aircraft.

[Item 7]

The electronic component as set forth in Item 6,
  wherein in a state attached to the aircraft, the connecting part is configured to be at a position set apart from the lift generating center of the aircraft by a predetermined distance in a horizontal direction.

[Item 8]

The electronic component as set forth in any one of Items 1 to 7,
  wherein in a state attached to the aircraft, the connecting part is configured to be at a position that coincides with or substantially coincides with the center of gravity of squadronthe entire aircraft including the connecting part.

[Item 9]

The electronic component as set forth in any one of Items 1 to 7,
  wherein in a state attached to the aircraft, the connecting part is configured to be at a position within a predetermined range from the center of gravity of the aircraft squadron including the connecting part.

[Item 10]

The electronic component as set forth in any one of Items 1 to 9,
  wherein the arm part has a structure extending at least upward or downward from the connecting part, and has a mounting part capable of mounting an object to be mounted at a predetermined area at a distal end of the arm part.

[Item 11]

The electronic component as set forth in Item 10,
  wherein the arm part has a first portion extending upward from the connecting part, and a second portion extending downward,
  wherein a first mounting part capable of mounting a first object to be mounted is provided at a predetermined area at a distal end of the first portion, and
  a second mounting part capable of mounting a second object to be mounted is provided at a predetermined area at a distal end of the second portion.

[Item 12]

The electronic component as set forth in Item 11,
  wherein the aircraft has at least a main body part and a leg part extending below the main body part, and
  the arm part is configured to be displaceable so as to be located above a lower end of the leg part when in a landing state.

[Item 13]

An aircraft to which the electronic component as set forth in any one of Items 1 to 12 is attached.

[Item 14]

An attachment for an unmanned aircraft including, a camera unit having at least two cameras, a gimbal drive device provided with the camera unit, and an attachment part for attaching the gimbal drive device to a main body of the aircraft,
  wherein the gimbal drive device includes,
  a first gimbal part moving rotationally about a first horizontal axis direction which is a rotation axis along a horizontal direction, and
  a first drive unit for rotating the first gimbal part about the first horizontal axis direction,
  wherein the camera unit includes, a first camera unit including at least one first camera, and a second camera unit including at least one second camera,
  wherein the first camera unit and the second camera unit are respectively located at sides opposite each other in the vertical direction with the first horizontal axis therebetween, and
  the gimbal drive device and the main body of the aircraft are located at an area between the first camera unit and the second camera unit,
  wherein the first camera unit includes a plurality of the first cameras and a first battery that supplies power to the plurality of the first cameras, and
  the second camera unit includes a plurality of the second cameras and a second battery that supplies power to the plurality of the second cameras.

[Item 15]

An attachment for an unmanned aircraft including, a camera unit having at least two cameras, a gimbal drive device provided with the camera unit, and an attachment part for attaching the gimbal drive device to a main body of the aircraft,
  wherein the gimbal drive device includes,
  a first gimbal part moving rotationally about a first horizontal axis direction which is a rotation axis along a horizontal direction,
  a first drive unit for rotating the first gimbal part about the first horizontal axis direction,
  a second gimbal part moving rotationally about a second horizontal axis direction which is a rotation axis along a horizontal direction perpendicular to the first horizontal axis, provided on the first gimbal part, and
  a second drive unit for rotating the second gimbal part about the second horizontal axis direction, wherein the camera unit includes, a first camera unit including at least one first camera, and a second camera unit including at least one second camera, wherein the first camera unit and the second camera unit are respectively located at sides opposite each other in the vertical direction with the first horizontal axis therebetween, and the gimbal drive device and the main body of the aircraft are located at an area between the first camera unit and the second camera unit, wherein the first camera unit and the second camera unit are respectively located at sides opposite each other in the vertical direction with the second horizontal axis therebetween, and the first horizontal axis and the second horizontal axis are configured to intersect, wherein the intersection point of the first horizontal axis and the second horizontal axis coincides with or substantially coincides with the center of gravity of the camera unit.

[Item 16]

An attachment for an unmanned aircraft including, a camera unit having at least two cameras, a gimbal drive device provided with the camera unit, and an attachment part for attaching the gimbal drive device to a main body of the aircraft, wherein the gimbal drive device includes, a first gimbal part moving rotationally about a first horizontal axis direction which is a rotation axis along a horizontal direction, a first drive unit for rotating the first gimbal part about the first horizontal axis direction, a second gimbal part moving rotationally about a second horizontal axis direction which is a rotation axis along a horizontal direction perpendicular to the first horizontal axis, provided on the first gimbal part, and a second drive unit for rotating the second gimbal part about the second horizontal axis direction, wherein the camera unit includes, a first camera unit including at least one first camera, and a second camera unit including at least one second camera, wherein the first camera unit and the second camera unit are respectively located at sides opposite each other in the vertical direction with the first horizontal axis therebetween, and the gimbal drive device and the main body of the aircraft are located at an area between the first camera unit and the second camera unit, wherein the first camera unit and the second camera unit are respectively located at sides opposite each other in the vertical direction with the second horizontal axis therebetween, and the first horizontal axis and the second horizontal axis are configured to intersect, wherein the camera unit is point-symmetric or substantially point-symmetric with respect to the intersection point of the first horizontal axis and the second horizontal axis.

[Item 17]

An attachment for an unmanned aircraft including, a camera unit having at least two cameras, a gimbal drive device provided with the camera unit, and an attachment part for attaching the gimbal drive device to a main body of the aircraft, wherein the gimbal drive device includes, a first gimbal part moving rotationally about a first horizontal axis direction which is a rotation axis along a horizontal direction, a first drive unit for rotating the first gimbal part about the first horizontal axis direction, a second gimbal part moving rotationally about a second horizontal axis direction which is a rotation axis along a horizontal direction perpendicular to the first horizontal axis, provided on the first gimbal part, and a second drive unit for rotating the second gimbal part about the second horizontal axis direction, wherein the camera unit includes, a first camera unit including at least one first camera, and a second camera unit including at least one second camera, wherein the first camera unit and the second camera unit are respectively located at sides opposite each other in the vertical direction with the first horizontal axis therebetween, and the gimbal drive device and the main body of the aircraft are located at an area between the first camera unit and the second camera unit, wherein the first camera unit and the second camera unit are respectively located at sides opposite each other in the vertical direction with the second horizontal axis therebetween, and the first horizontal axis and the second horizontal axis are configured to intersect, wherein the intersection point of the first horizontal axis and the second horizontal axis coincides with or substantially coincides with the center of the main body of the aircraft.

[Item 18]

An attachment for an unmanned aircraft including, a camera unit having at least two cameras, a gimbal drive device provided with the camera unit, and an attachment part for attaching the gimbal drive device to a main body of the aircraft, wherein the gimbal drive device includes, a first gimbal part moving rotationally about a first horizontal axis direction which is a rotation axis along a horizontal direction, a first drive unit for rotating the first gimbal part about the first horizontal axis direction, a second gimbal part moving rotationally about a second horizontal axis direction which is a rotation axis along a horizontal direction perpendicular to the first horizontal axis, provided on the first gimbal part, a second drive unit for rotating the second gimbal part about the second horizontal axis direction, a third drive unit for rotating the camera unit about a vertical axis direction along the vertical direction, wherein the camera unit includes, a first camera unit including at least one first camera, and a second camera unit including at least one second camera, wherein the first camera unit and the second camera unit are respectively located at sides opposite each other in the vertical direction with the first horizontal axis therebetween, and the gimbal drive device and the main body of the aircraft are located at an area between the first camera unit and the second camera unit, wherein the first camera unit and the second camera unit are respectively located at sides opposite each other in the vertical direction with the second horizontal axis therebetween, and the first horizontal axis and the second horizontal axis are configured to intersect, wherein the third drive unit is provided so as to include the intersection point of the first horizontal axis and the second horizontal axis.

[Item 19]

An aircraft to which the attachment for the aircraft according to any one of Items 14 to 18 is attached.

DETAILS OF EMBODIMENT

First Embodiment

Hereinafter, the electronic component according to the first embodiment of the present disclosure will be described with reference to the accompanying drawings.

In the following description, terms may be used according to the following definitions.

Front-rear direction: +Y direction and −Y direction

Up-down direction (or vertical direction): +Z direction and −Z direction

Left-right direction (or horizontal direction): +X direction and −X direction

Traveling direction (forward): −Y direction

Reverse direction (backward): +YX direction

Ascending direction (upward): +Z direction

Descending direction (downward): −Z direction

As shown in FIG. 3, the electronic component according to the first embodiment includes an attachment part 10, an arm part 20, and a connecting part (gimbal) 30. The attachment part 10 is a part for attaching to an aircraft described later. The shape, attachment method, and fixing method of the attachment part 10 can be appropriately changed according to the shape and structure of the attachment portion of the aircraft to be attached. The arm part 20 is long-shaped and elongated in the up-down direction, and a connecting part 30 is provided at a center part. The arm part 20 includes an upper arm (first portion) 20U located above the connecting part and a camera 21 provided at a distal end of the upper arm 20U, and a lower arm (second portion) 20B located below the connecting part and a camera 22 provided at a distal end of the lower arm 20B.

The arm part 20 can be formed of various materials such as an aluminum alloy, magnesium alloy, carbon, and the like. The connecting part 30 according to the present embodiment is a so-called biaxial gimbal having a first drive unit 30P and a second drive unit 30R. As shown by the arrows in FIG. 4, the first drive unit 30P can swing the entire arm part 20 within a predetermined range in the pitch direction, and the second drive unit 30R can swing the entire arm part within a predetermined range in the roll direction. The devices attached to the upper and lower ends of the arm part 20 may be sensors or other detection devices as well as cameras.

In addition, the connecting part 30 may be a triaxial gimbal. Further, the rotation axes of at least two or more gimbals may intersect.

According to the above configuration, the arm part 20 becomes displaceable within a predetermined range with respect to the attachment part 10 via the connecting part 30. Accordingly, for example, even when an aircraft described later shakes or vibrates in the air, the displacement can be absorbed.

Second Embodiment

As shown in FIG. 5, similarly to the electronic component of the first embodiment described above, the electronic component 1a according to the second embodiment of the present disclosure also has an attachment part 10, an arm part 20, and a connecting part (gimbal) 30. In the following description, components having the same functions are denoted by the same reference numerals, and a detailed description thereof is omitted.

As shown in FIG. 5, the connecting part 30 according to the present embodiment is connected at a position that coincides with the center of gravity G of the arm part 20 (the position of the connecting part 30 indicated by the solid line in the figure) or substantially coincides therewith (the position of the connecting part 30' indicated by the dotted line in the figure). According to such a configuration, since the attachment part 10 (=aircraft) and the arm part 20 are connected by the connecting part 30, the displacement of the aircraft with respect to the arm part 20 is canceled out by the operation of the connecting part 30. In addition, since the center of gravity for the acceleration of any vector that acts on the arm part 20 through the connecting part 30 is the same, no torque is generated on the arm part 20. In other words, it becomes difficult for the displacement, vibration, and the like of the airframe accompanying the flight of the aircraft to be transmitted to the arm part 20. In this manner, the rotational motion in the pitch and roll directions, which causes camera shake, does not occur, and it becomes possible for the cameras 21 and 22 to always maintain a constant direction.

Third Embodiment

As shown in FIG. 6, similarly to the electronic component of the first embodiment described above, the electronic component 1b according to the third embodiment of the present disclosure also has an attachment part 10, an arm part 20, and a connecting part (gimbal) 30. In the following description, components having the same functions are denoted by the same reference numerals, and a detailed description thereof is omitted.

As shown in FIG. 6, the connecting part 30 according to the present embodiment coincides with the center C of the arm part 20 (the position of the connecting part 30 indicated by the solid line in the figure) or substantially corresponds therewith (the position of the connecting part 30' indicated by the dotted line in the figure). According to such a configuration, for example, when the upper arm 20U and the lower arm have the same shape, the displacement of the aircraft with respect to the arm part 20 is canceled out by the operation of the connecting part 30. Accordingly, the rotational motion in the pitch and roll directions, which causes the camera shake, does not occur, and it becomes possible for the cameras 21 and 22 to always maintain a constant direction.

Fourth Embodiment

As shown in FIG. 7, similarly to the electronic component of the first embodiment described above, the electronic component 1c according to the fourth embodiment of the present disclosure also has an attachment part 10, an arm part 20, and a connecting part (gimbal) 30. In the following description, components having the same functions are denoted by the same reference numerals, and a detailed description thereof is omitted.

As shown in FIG. 7, the connecting part 30 according to the present embodiment coincides with the center C of the arm part 20 (the position of the connecting part 30 indicated by the solid line in the figure) or substantially coincides therewith (the position of the connecting part 30' indicated by the dotted line in the figure). According to such a configuration, for example, when the upper arm 20U and the lower arm have the same shape, the displacement of the aircraft with respect to the arm part 20 is canceled out by the operation of the connecting part 30. Accordingly, the rotational motion in the pitch and roll directions, which causes the camera shake, does not occur, and the cameras 21 and 22 can always maintain a fixed direction.

(First Attachment Method)

Next, a method of attaching an electronic component according to the present embodiment (the electronic component or the like according to the first embodiment) to an aircraft 100 will be described with reference to FIG. 8. The electronic component in the attachment method described below can be applied to any of the electronic components according to the above-described first to fourth embodiments.

As shown in FIG. 8, in the attachment method according to the present embodiment, in a state attached to the aircraft 100, the connecting part 30 is configured to be at a position that coincides with or substantially coincides with a lift generating center of the aircraft. The lift generating center coincides with the center of the lift generated on the body of the aircraft 100 by the rotation of rotary blades. In other words, the center of the lift is the point of action of the lift generated by the rotation of the rotary blades of the aircraft 100 acting on the aircraft 100. More specifically, when the width of each rotary blade in the transverse direction (vertical direction in the figure) is d, the lift of each rotary blade acts in a position within the range of d in the width direction of each rotary blade. Then, as shown in FIG. 22, when seen from the top, the position within d in the width direction of each rotary blade, and around the center of the circle where the rotation axis of each rotary blade passes through, is the center of the lift as shown in FIG. 22.

(Second Attachment Method)

Next, a method of attaching an electronic component according to the present embodiment (the electronic component or the like according to the first embodiment) to the aircraft 100 will be described with reference to FIG. 9.

According to the present embodiment, in a state where the arm part 20 is attached to the aircraft, the connecting part 30 is configured to be at a position within a predetermined range from a lift generating center of the aircraft 100 (for example, a position where connecting part 30' is located). According to such a configuration, for example, due to the shape, size, etc. of the airframe, it is possible to prevent a part of the airframe from being reflected in a certain part of the field of vision of the cameras 21 and 22.

(Third Attachment Method)

Next, a method of attaching the electronic component according to the present embodiment (the electronic component or the like according to the first embodiment) to the aircraft 100 will be described with reference to FIG. 10.

In the present embodiment, in a state where the arm part 20 is attached to the aircraft, the connecting part 30 is configured to be at a position rearward from the lift generating center of the aircraft 100 by a distance L in the horizontal direction. According to such a configuration, particularly when the aircraft 100 moves forward, it is possible to prevent a part of an airframe from being reflected in a certain part of the field of vision of the cameras 21 and 22 (details will be described with reference to FIGS. 15 to 20).

The distance L is preferably a distance (L in the figure) equal to or less than the axis of the rotary blade from the lift generation center (refer to FIG. 8), but may be further rearward than the axis of the rear rotary blade if necessary.

(Fourth Attachment Method)

Next, a method of attaching the electronic component according to the present embodiment (the electronic component or the like according to the first embodiment) to the aircraft 100 will be described with reference to FIG. 11.

In the present embodiment, in a state where the arm part 20 is attached to the aircraft, the connecting part 30 is configured to be at a position that coincides with or substantially coincides with the center of gravity of the aircraft 100. According to such a configuration, it is possible to effectively cancel out the displacement of the aircraft 100 by the connecting part. In particular, as in the second embodiment, if an electronic part is used in which the connecting part 30 is attached to the center of gravity of the arm part 20, the aircraft 100 and the electronic part are connected at their respective centers of gravity and thus, a further effect is exhibited.

(Fifth Attachment Method)

Next, a method of attaching the electronic component according to the present embodiment (the electronic component or the like according to the first embodiment) to the aircraft 100 will be described with reference to FIG. 12.

According to the present embodiment, in a state where the arm part 20 is attached to the aircraft, the connecting part 30 is located at a position within a predetermined range from the center of gravity of the aircraft 100 (for example, a position where the connecting unit 30' is located). According to such a configuration, for example, due to the shape, size, etc. of the airframe it is possible to prevent a part of the airframe from being reflected in a certain part of the field of vision of the cameras 21 and 22.

(Sixth Attachment Method)

Next, a method of attaching the electronic component to the aircraft 100 according to the present embodiment will be described with reference to FIG. 13.

As shown in FIG. 13, the arm part 20 according to the present embodiment includes only the upper arm 20U. In this case, the connecting part 30 is provided at the lower end of the upper arm 20U.

(Seventh Attachment Method)

Next, a method of attaching the electronic component according to the present embodiment to the aircraft 100 will be described with reference to FIG. 14.

As shown in FIG. 14, the arm section 20 according to the present embodiment includes only the lower arm B. In this case, the connecting part 30 is provided at the upper end of the lower arm 20B.

<Flying Method>

Next, the control of the aircraft 100 will be described with reference to FIGS. 15 to 20. As shown in FIG. 15, the aircraft 100 has four rotary blades (propellers) 110, a motor 120 which is the power for rotating the propeller, a frame 160 that supports the motor 120 and is the skeleton of the aircraft 100, a leg 170 extending downward from the frame 160, and a camera 150.

The rotary blade 110 receives an output from the motor 120 and rotates. The rotation of the rotary blade 110 generates a propulsive force for the aircraft 100 to take off from a starting point, move horizontally, and land at a destination. The rotary blade 110 can rotate rightward, stop, and rotate leftward.

The rotary blade 110 of the present disclosure has an elongated blade. Any number of blades (rotors) (e.g., 1, 2, 3, 4, or more blades) can be provided. Further, the shape of the blades can be any shape such as a flat shape, a bent shape, a twisted shape, a tapered shape, or a combination thereof. In addition, the shape of the blades can be transformed (for example, size-adjustable, foldable, bendable, etc.). The blades can be symmetrical (having the same upper and lower surfaces) or asymmetric (having differently shaped upper and lower surfaces). The blades can be formed to have a geometrical form that is suitable for generating dynamic aerodynamic forces (e.g., lift, thrust) as an airfoil, wing or blade is moved through the air. The geometrical form of a blade can be selected as appropriate to optimize the dynamic air characteristics of the blade, such as increasing lift and thrust and reducing drag.

The motor 120 causes the rotation of the rotary blade 110, and for example, the drive unit can include an electric motor or an engine or the like. The blades can be driven by the motor and rotate around an axis of rotation of the motor (e.g., the long axis of the motor) in a clockwise and/or counterclockwise direction.

All the blades can rotate in the same direction, or it is also possible to rotate independently. Some of the blades rotate in one direction and the other blades rotate in the other direction. All of the blades can be rotated at the same rotational speed, and can also be rotated at different rotational speeds. The rotational speed can be determined automatically or manually based on the dimensions (for example, size, weight) and the control state (speed, moving direction, etc.) of the moving body.

An arm 160 is a member that respectively supports a corresponding motor 120 and rotary blade 110. The arm 160 may be provided with a color displaying body such as an LED to indicate a flight state, a flight direction, etc. of the rotorcraft. The arm 160 according to the present embodiment can be formed of a material appropriately selected from carbon, stainless steel, aluminum, magnesium, etc., or alloys or combinations thereof.

<Detailed Description of Flight>

Next, a flight mode of the aircraft 1 according to the present embodiment will be described with reference to FIGS. 16 to 20. In addition, in the following description, in order to clarify the description, three modes of ascending and hovering, moving horizontally (forward/backward), and descending will be described, respectively. As a matter of course, a mode of flying by a combination of these modes is naturally included.

<When Ascending>

As shown in FIG. 16, a user operates a radio control transmitter provided with an operation unit to increase the output of the motor 120 of the aircraft and increase the rotational speed of the rotary blade 110. As the rotary blade 110 rotates, a lift required to lift the aircraft 1 is generated vertically upward. When the lift exceeds the gravity acting on the aircraft 1, the aircraft 100 leaves the ground and takes off from the starting point.

As shown, when ascending, the aircraft 1100 including the arm 160 is generally kept horizontal. In other words, when the lift generated by each of the rotary blades 110 is equal to each other, the gravitational force applied to the aircraft 100 in the front-rear direction coincides with the center of gravity. Thereby, the aircraft 100 can ascend while staying leveled.

Further, the aircraft 100 can hover when a weight applied to the aircraft 100 and the lift generated in the aircraft 100 due to the rotation of the rotary wing 110 are mechanically balanced. At this time, the altitude of the aircraft 100 is maintained at a constant level. The aircraft 100 in the present embodiment maintains the same attitude as that of FIG. 2 as described above during hovering.

<When Moving Horizontally>

As shown in FIG. 17, when the aircraft 100 moves forward in the horizontal direction, the rotational speed of the rotary blade 110 located rearward in the traveling direction is controlled to be higher than the rotational speed of the rotary blade 110 located forward in the traveling direction. Accordingly, as shown, the aircraft 100 assumes a forward leaning posture. At this time, the direction of the electronic component (arm part 20) is kept the same as that at the time of hovering due to the presence of the connecting part 30.

Meanwhile, as shown in FIG. 18, when the aircraft 100 moves backward in the horizontal direction, the rotational speed of the rotary blade 110 located forward in the traveling direction is controlled to be higher than the rotational speed of the rotary blade 110 located rearward in the traveling direction. Accordingly, as shown, the aircraft 100 assumes a rearward leaning posture. At this time, likewise, the direction of the electronic component (arm part 20) is kept the same as that at the time of hovering due to the presence of the connecting part 30.

<When Descending (when Landing)>

As shown in FIG. 19, the aircraft 100 descends by lowering the rotational speed of the rotor. At this time, the lower arm 20B of the arm part 20 is displaced so as to be located above the lower end of the leg 170. In other words, the lower arm 20B is accommodated in an area defined to be surrounded by the frame 160 and the leg 170. According to such a configuration, as shown in FIG. 20, the arm part 20 does not collide with the ground GND during landing.

In addition, as shown in FIG. 23, the lower arm 20B of the arm part 20 may be rotated in a direction D (rearward) opposite to the direction shown in FIGS. 19 and 20. In other words, the lower arm 20B may be located outside an area defined to be surrounded by the frame 160 and the leg 170, and the cameras 21 and 22 may be located above the distal end of the leg 170. According to such a configuration, as shown in FIG. 24, the arm part 20 does not collide with the ground GND during landing.

In the above-described embodiment, the connecting part 30 has the first drive unit 30P provided at the rear of the main body and the second drive unit 30R provided at the front of the main body (refer to FIGS. 3 and 8). However, as shown in FIG. 25, the first drive unit 30P may be provided in front of the main body, and the second drive unit 30R may be provided behind the main body.

The embodiment described above is merely an example to facilitate the understanding of the present disclosure and are not intended to limit the present disclosure. The present disclosure can be modified and improved without departing from the gist thereof, and as a matter of course, the present disclosure includes the equivalents thereof.

REFERENCE NUMERALS 1 electronic component
20 arm part
30 connecting part
100 aircraft
110 propeller (lift generator)
120 motor
160 frame

The invention claimed is:
1. An aircraft, comprising:
a main body part; and
an electronic component,
wherein the electronic component comprises an arm part having one or more devices, an attachment part for attachment to the main body part at a single point and being detachable from the main body part, and a connecting part for connecting the arm part and the attachment part so as to rotate the arm part within a predetermined range, wherein the attachment part is attached to the main body part at a backward position within a predetermined range from a lift generating center of the aircraft, wherein the arm part is bent toward the main body part at a point between the connecting part and an end of the arm part, and wherein the connecting part is connected to a position that coincides with or substantially coincides with the center of gravity of the arm part.

2. The electronic component of claim 1,
wherein the connecting part is connected to a position at the center or substantially the center of the arm part.

3. The electronic component of claim 1,
wherein the shape of the arm part is point-symmetric or substantially point-symmetric with respect to the connecting part.

4. The electronic component of claim 1,
wherein in a state attached to the aircraft, the connecting part is configured to be at a position that coincides with or substantially coincides with the lift generating center of the aircraft.

5. The electronic component of claim 1,
wherein in a state attached to the aircraft, the connecting part is configured to be at a position set apart from the lift generating center of the aircraft by a predetermined distance in a horizontal direction.

6. The electronic component of claim 1,
wherein in a state attached to the aircraft, the connecting part is configured to be at a position that coincides with or substantially coincides with the center of gravity of the aircraft.

7. The electronic component of claim 1,
wherein in a state attached to the aircraft, the connecting part is configured to be at a position within a predetermined range from the center of gravity of the aircraft.

8. The electronic component of claim 1,
wherein the arm part has a structure extending at least upward or downward from the connecting part, and has a mounting part capable of mounting an object to be mounted at a predetermined area at a distal end of the arm part.

9. The electronic component of claim 8,
wherein the arm part has a first portion extending upward from the connecting part, and a second portion extending downward, wherein a first mounting part capable of mounting a first object to be mounted is provided at a predetermined area at a distal end of the first portion, and a second mounting part capable of mounting a second object to be mounted is provided at a predetermined area at a distal end of the second portion.

10. The electronic component of claim 9,
wherein the aircraft further comprises a leg part extending below the main body part, and the arm part is configured to be displaceable so as to be located above a lower end of the leg part when in a landing state.

11. The electronic component of claim 1, wherein the arm part includes a first portion and a second portion, the first portion is located above the connecting part and bent toward the main body part, and the second portion is located below the connecting part and bent toward the main body part.

12. An aircraft, comprising:
a main body part; and
an electronic component,
wherein the electronic component comprises:
   an arm part;
   a camera unit having at least two cameras;
   an attachment part for attaching the gimbal drive device to the main body at a single point and being detachable from the main body part, the attachment part being attached to the main body part at a backward position within a predetermined range from a lift generating center of the aircraft; and
   a gimbal drive device provided with the camera unit and configured to connect the arm part and the attachment part so as rotate the arm part within a predetermined range, wherein the arm part is bent toward the main body part at a point between the connecting part and an end of the arm part, wherein the gimbal drive device comprises:
   a first gimbal part moving rotationally about a first horizontal axis direction which is a rotation axis along a horizontal direction; and
   a first drive unit for rotating the first gimbal part about the first horizontal axis direction, wherein the camera unit comprises a first camera unit and a second camera unit, wherein the first camera unit and the second camera unit are respectively located at sides opposite each other in a vertical direction with the first horizontal axis therebetween, and wherein the gimbal drive device and the main body of the aircraft are located at an area between the first camera unit and the second camera unit, wherein the first camera unit comprises a plurality of first cameras and a first battery that supplies power to the plurality of first cameras, and wherein the second camera unit comprises a plurality of second cameras and a second battery that supplies power to the plurality of the second cameras.

* * * * *